United States Patent
Mun et al.

(10) Patent No.: US 8,892,072 B2
(45) Date of Patent: Nov. 18, 2014

(54) MOBILE TERMINAL AND METHOD OF PROVIDING SECURITY THERETO

(75) Inventors: Jaeseung Mun, Seoul (KR); Junghyub Lee, Seoul (KR); Haebong Kim, Seoul (KR); Junghoon Chu, Seoul (KR); Yoona Cho, Seoul (KR); Taeyong Kim, Seoul (KR); Jaeseon Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 127 days.

(21) Appl. No.: 13/484,601

(22) Filed: May 31, 2012

(65) Prior Publication Data

US 2013/0078951 A1 Mar. 28, 2013

(30) Foreign Application Priority Data

Sep. 23, 2011 (KR) .................. 10-2011-0096190
Apr. 18, 2012 (KR) .................. 10-2012-0040491

(51) Int. Cl.

| H04M 1/66 | (2006.01) |
|---|---|
| H04M 1/673 | (2006.01) |
| H04W 12/00 | (2009.01) |
| H04L 29/06 | (2006.01) |
| G06F 21/31 | (2013.01) |
| H04W 12/06 | (2009.01) |
| G06F 21/30 | (2013.01) |
| H04M 1/667 | (2006.01) |
| H04M 1/67 | (2006.01) |

(52) U.S. Cl.
CPC .............. *H04M 1/67* (2013.01); *H04M 1/673* (2013.01); *H04W 12/00* (2013.01); *H04L 63/083* (2013.01); *G06F 21/31* (2013.01); *H04W 12/06* (2013.01); *G06F 21/305* (2013.01); *H04M 1/667* (2013.01)

USPC ........... 455/411; 455/410; 455/566; 455/420

(58) Field of Classification Search
CPC ......................... H04W 12/12; H04M 1/72519
USPC .................. 455/566, 410–414.3, 418–420
See application file for complete search history.

(56) References Cited

U.S. PATENT DOCUMENTS

| RE41,997 E  * | 12/2010 | Kinoshita ................. 455/412.1 |
|---|---|---|
| 8,615,216 B2 * | 12/2013 | Rajguru .................... 455/410 |
| 2002/0087892 A1 | 7/2002 | Imazu ....................... 713/202 |
| 2010/0279675 A1 | 11/2010 | Slack et al. ................. 455/419 |
| 2010/0299721 A1 * | 11/2010 | Awamoto ....................... 726/3 |
| 2011/0072520 A1 | 3/2011 | Bhansali et al. ............. 726/27 |
| 2011/0159844 A1 * | 6/2011 | Gillet et al. ................ 455/411 |

OTHER PUBLICATIONS

European Search Report dated Feb. 6, 2013 issued in Application No. 12 18 4911.

* cited by examiner

*Primary Examiner* — Sharad Rampuria
(74) *Attorney, Agent, or Firm* — Ked & Associates, LLP

(57) ABSTRACT

A method and apparatus for providing security of a mobile terminal in various ways are disclosed. The present invention includes receiving a $1^{st}$ signal from a mobile communication network via a wireless communication unit, when the display unit is activated, displaying a $1^{st}$ substitute screen including a password input window on a display unit, inputting a password to the password input window, transmitting the inputted password to the mobile communication network via the wireless communication unit, if a $2^{nd}$ signal indicating that the password is valid is received from the mobile communication network in response to the transmission, canceling the $1^{st}$ substitute screen, and if a $3^{rd}$ signal indicating that the password is not valid is received, maintaining the $1^{st}$ substitute screen.

38 Claims, 19 Drawing Sheets

(a)

(b)

(a)

(b)

(a)    (b)

(c)

(d)

(a)

(b)

(a)

(b)

MOBILE TERMINAL AND METHOD OF PROVIDING SECURITY THERETO

Pursuant to 35 U.S.C. §119(a), this application claims the benefit of earlier filing date and right of priority to Korean Patent Application Nos. 10-2011-0096190, filed on Sep. 23, 2011, and 10-2012-0040491, filed on Apr. 18, 2012, the contents of which are hereby incorporated by reference herein in their entirety.

BACKGROUND OF THE INVENTION

1. Field of the Invention

The present invention relates to a mobile terminal, and more particularly, to a mobile terminal and security providing method thereof. Although the present invention is suitable for a wide scope of applications, it is particularly suitable for providing a method and apparatus for providing security of a mobile terminal in various ways.

2. Discussion of the Related Art

Generally, terminals can be classified into mobile/portable terminals and stationary terminals. The mobile terminals can be further classified into handheld terminals and vehicle mount terminals according to possibility of user's direct portability.

As functions of the terminal are getting diversified, the terminal tends to be implemented as a multimedia player provided with composite functions such as photographing of photos or videos, playback of music or video files, game play, broadcast reception and the like for example.

To support and increase the terminal functions, it may be able to consider the improvement of structural parts and/or software parts of the terminal.

Recently, such a mobile terminal of high performance/cost as a smart phone, a smart tablet and the like is popularized and a user uses such a mobile terminal for various usages. To this end, various kinds of information are stored within the mobile terminal. If the mobile terminal is lost, it may be highly possible to leak personal data. Thus, the demand for a method of providing security to a mobile terminal more effectively in case of such a loss of the mobile terminal is rising.

SUMMARY OF THE INVENTION

Accordingly, the present invention is directed to a mobile terminal, controlling method thereof and security providing method thereof that substantially obviate one or more problems due to limitations and disadvantages of the related art.

An object of the present invention is to provide a mobile terminal and controlling method thereof, by which a service for protecting and recovering internal data is provided in case of losing the mobile terminal in a manner of restricting functions of the mobile terminal of a user and using a function of deleting data saved in the mobile terminal, a function of tracking a location of the mobile terminal, and the like.

Another object of the present invention is to provide a mobile terminal security method, by which possibility in password leakage is reduced in a manner of remotely setting a lock function in the mobile terminal and preventing the password from being saved in the mobile terminal.

Technical tasks obtainable from the present invention are non-limited the above-mentioned technical task. And, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to one embodiment of the present invention includes a wireless communication module configured to transceive data with an external device by wireless, a user input unit configured to receive an input of a command from a user, a display unit, and a controller, if a $1^{st}$ signal is received from a mobile communication network via the wireless communication unit, when the display unit is activated, controlling a $1^{st}$ substitute screen including a password input window to be displayed on the display unit.

In another aspect of the present invention, a method of controlling a mobile terminal according to another embodiment of the present invention includes the steps of receiving a $1^{st}$ signal from a mobile communication network via a wireless communication unit, when the display unit is activated, displaying a $1^{st}$ substitute screen including a password input window on a display unit, inputting a password to the password input window, transmitting the inputted password to the mobile communication network via the wireless communication unit, if a $2^{nd}$ signal indicating that the password is valid is received from the mobile communication network in response to the transmission, canceling the $1^{st}$ substitute screen, and if a $3^{rd}$ signal indicating that the password is not valid is received, maintaining the $1^{st}$ substitute screen.

In a further aspect of the present invention, a method of providing security, which is provided to a mobile terminal in a mobile communication system including a web server, a web terminal configured to access the web server, a push server, a database server configured to store a $1^{st}$ password and a relay server, according to a further embodiment of the present invention include the steps of selecting a security function executed in the mobile terminal via the web terminal, transmitting an execution command of the selected security function to the mobile terminal from the push server, and executing the security function corresponding to the execution command in the mobile terminal.

Accordingly, the present invention provides the following effects and/or features.

First of all, the present invention provides a further enhanced security function to a mobile terminal.

Secondly, when a mobile terminal is lost, the present invention provides a service for protecting and recovering internal data in a manner of restricting functions of the mobile terminal of a user and using a function of deleting data saved in the mobile terminal, a function of tracking a location of the mobile terminal, and the like.

Thirdly, the present invention reduces possibility in password leakage in a manner of remotely setting a lock function in the mobile terminal and comparing a password to another password saved in an external server instead of saving the password in the mobile terminal.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are often used for elements in order to facilitate discussion of the disclosure. Therefore, significant meanings or roles are not given to the suffixes themselves and it is understood that the 'module', 'unit' and 'part' can be used together or interchangeably.

Various types of terminals may be implemented using the various techniques discussed herein. Examples of such terminals include mobile as well as stationary terminals, such as mobile phones, user equipment, smart phones, DTV, computers, digital broadcast terminals, personal digital assistants, portable multimedia players (PMPs), navigators, and the like. By way of non-limiting example only, further description will be with regard to a mobile terminal 100, and such teachings may apply equally to other types of terminals.

Figure 1:
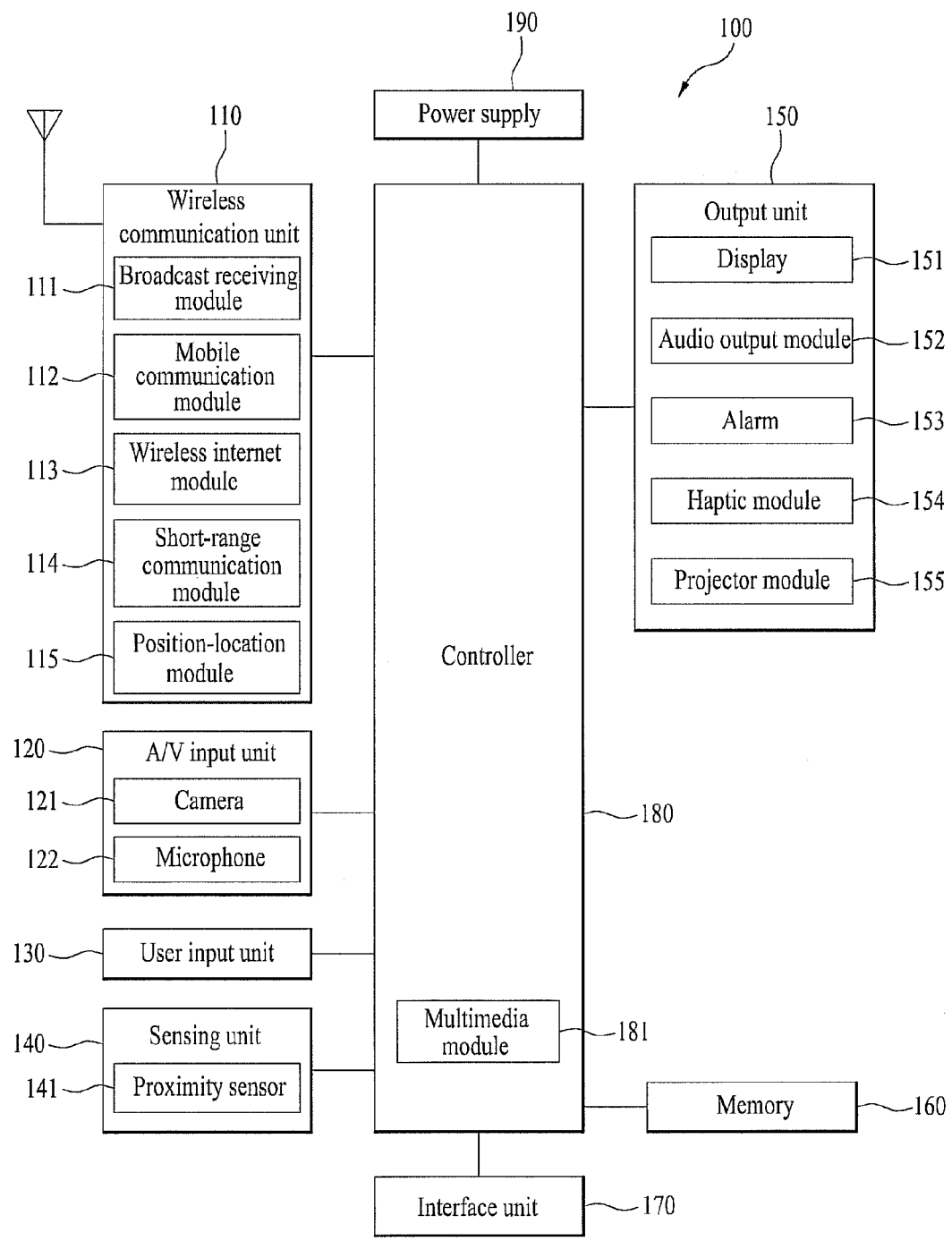
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 having a wireless communication unit 110, an A/V (audio/video) input unit 120, a user input unit 130, a sensing unit 140, an output unit 150, a memory 160, an interface unit 170, a controller 180, a power supply unit 190, among other components. Mobile terminal 100 is shown having various components, but it is understood that implementing all of the illustrated components is not a requirement as greater or fewer components may alternatively be implemented.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115, and the like.

The broadcast receiving module 111 receives a broadcast signal and/or broadcast associated information from an external broadcast managing server via a broadcast channel. The broadcast channel may include a satellite channel and a terrestrial channel. The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. This broadcast associated information can also be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured to be suitable for other broadcasting systems as well as the above-identified digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceiving, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), LTE (Long Term Evolution) and the like.

The short-range communication module 114 facilitates relatively short-range communications. Suitable technologies for implementing this module include radio frequency identification (RFID), infrared data association (IrDA), ultra-wideband (UWB), Near field communication (NFC) as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring still to FIG. 1, the audio/video (A/V) input unit 120 is shown configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. Typically, the processed image frames can be displayed on the display 151.

The image frames processed by the camera 121 can be stored in the memory 160 or can be externally transmitted via the wireless communication unit 110. Optionally, two or more cameras 121 can be provided to the mobile terminal 100 according to the environment in which the terminal used to according to user needs.

The microphone 122 receives an external audio signal while the portable device is in a particular mode, such as phone call mode, recording mode and voice recognition mode. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, and the like.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. If desired, the sensing unit 140 can include a proximity sensor 141.

The output unit 150 generates outputs relevant to the senses of sight, hearing, touch and the like. In some cases, the output unit 150 includes the display 151, an audio output module 152, an alarm unit 153, a haptic module 154, a projector module 155, and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmissive type, which can be named a transparent display. As a representative example for the transparent display, there is TOLED (transparent OLED) or the like. A rear configuration of the display 151 can be implemented in the optical transmissive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In the case where the display 151 and a sensor for detecting a touch action (hereinafter also referred to a 'touch sensor') configures a mutual layer structure (hereinafter also referred to a 'touchscreen'), the user can use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

With continued reference to FIG. 1, a proximity sensor (not shown in the drawing) can be provided to an internal area of the mobile terminal 100 enclosed by the touchscreen or proximate to the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one or more of a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor, and the like. When the touchscreen includes the electrostatic capacity proximity sensor, it may also be configured to detect the proximity of a pointer using a variation of electric field according to the proximity of the pointer. In this scenario, the touchscreen (touch sensor) can be classified as a proximity sensor.

In the following description, for clarity, an action that a pointer approaches without contacting with the touchscreen to be recognized as located on the touchscreen is referred to as 'proximity touch' while an action that a pointer actually touches the touchscreen may be referred to as a 'contact touch'. The meaning of the position on the touchscreen proximity-touched by the pointer refers to the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing element (not shown in the drawing) for producing an image to output externally using the light generated from the light source, and a lens (not shown in the drawing) for enlarging the image for output externally at predetermined focus distance. The projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. It is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on the Internet.

The interface unit 170 is often implemented couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identity Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component. Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such feature may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
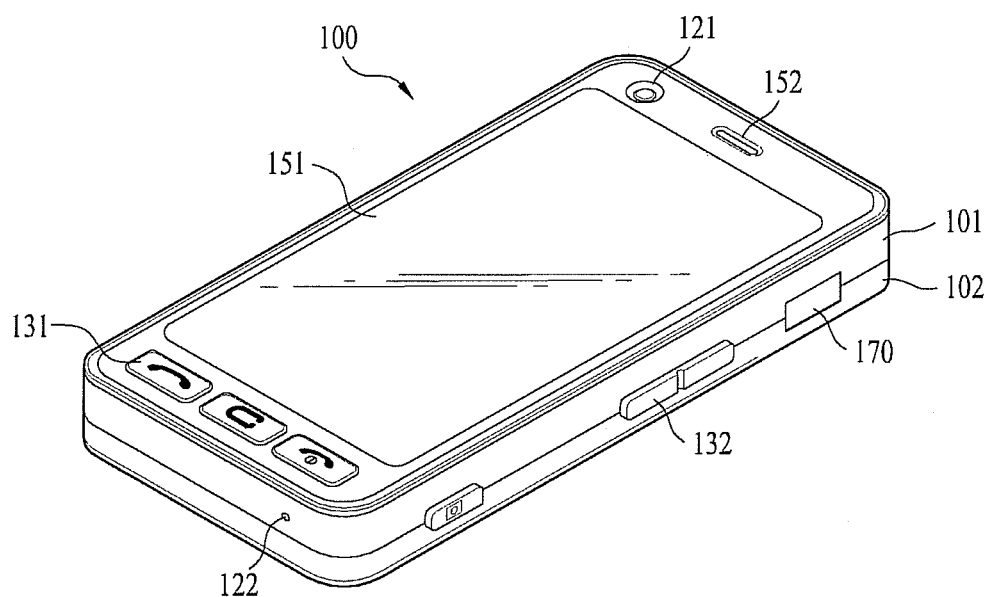
FIG. 2 is a front perspective diagram of a mobile terminal according to one embodiment of the present invention.

FIG. 2 is a front perspective diagram of a mobile terminal according to various embodiments of the present invention. The mobile terminal 100 is shown as a bar type terminal body, but the mobile terminal may alternative be implemented using other configuration such as folder-type, slide-type, rotational-type, swing-type, combinations thereof, and the like. For clarity, further disclosure will primarily relate to a bar-type mobile terminal 100, but such teachings apply equally to other types of mobile terminals.

Referring still to FIG. 2, the mobile terminal 100 includes a case (casing, housing, cover, etc.) configuring an exterior thereof. The case is shown divided into a front case 101 and a rear case 102. Various electric/electronic parts are positioned or otherwise located in a space or cavity provided between the front and rear cases 101 and 102. Optionally, at least one middle case can be further provided between the front and rear cases 101 and 102. The cases 101 and 102 may be formed by injection molding of synthetic resin or they can be formed of metal substance such as stainless steel (STS), titanium (Ti) or the like, for example.

A display 151, an audio output unit 152, a camera 121, user input units 130/131 and 132, a microphone 122, an interface 180 and the like can be provided to the terminal body, and more particularly, to the front case 101.

The display 151 is shown occupying the majority of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. The input unit 130 may also include a plurality of manipulating units 131 and 132. The manipulating units 131 and 132 will sometimes be referred to herein as a manipulating portion and they may implement any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. A command for volume adjustment of sound outputted from the audio output unit 152, a command for switching to a touch recognizing mode of the display 151 or the like can be inputted to the second manipulating unit 132.

Meanwhile, such a graphic for pointing at a specific object on a display unit or selecting a menu from the display unit as an arrow, a finger and the like is called a pointer or a cursor. Yet, the pointer is frequently used to mean a finger, a stylus pen or the like for a touch manipulation and the like. In order to clearly discriminate the pointer and the cursor from each other in this disclosure, a graphic displayed on a display unit is named a cursor and such a physical means for performing a touch, a proximity touch, a gesture and the like as a finger, a stylus pen and the like is named a pointer.

For clarity and convenience of the following description, a mobile terminal mentioned in the following description is assumed as including at least one of the components shown in FIG. 1.

Mobile Communication System Configuration

A mobile terminal according to the present invention is able to activate or deactivate various security functions by being linked to a mobile communication system in order to provide security. And, the mobile terminal is able to query the mobile communication system about whether a process for this operation is performed. Moreover, the mobile terminal is able to report a result of the process to the mobile communication system. A user is able to activate various functions for preventing an unauthorized use (e.g., an unwanted call, leakage of information saved in a mobile terminal, etc.) of a lost mobile terminal or acquiring a current location of a mobile terminal via webpages, applications and the like. An access to a webpage or an activation of an application may be performed by an Internet connectible computer, another mobile terminal or the like. And, a security function selected via the corresponding webpage or application may be delivered to the mobile terminal via a mobile communication network. A detailed configuration of a mobile communication system to secure the implementation of this operation is described with reference to FIG. 3 as follows.

Figure 3:
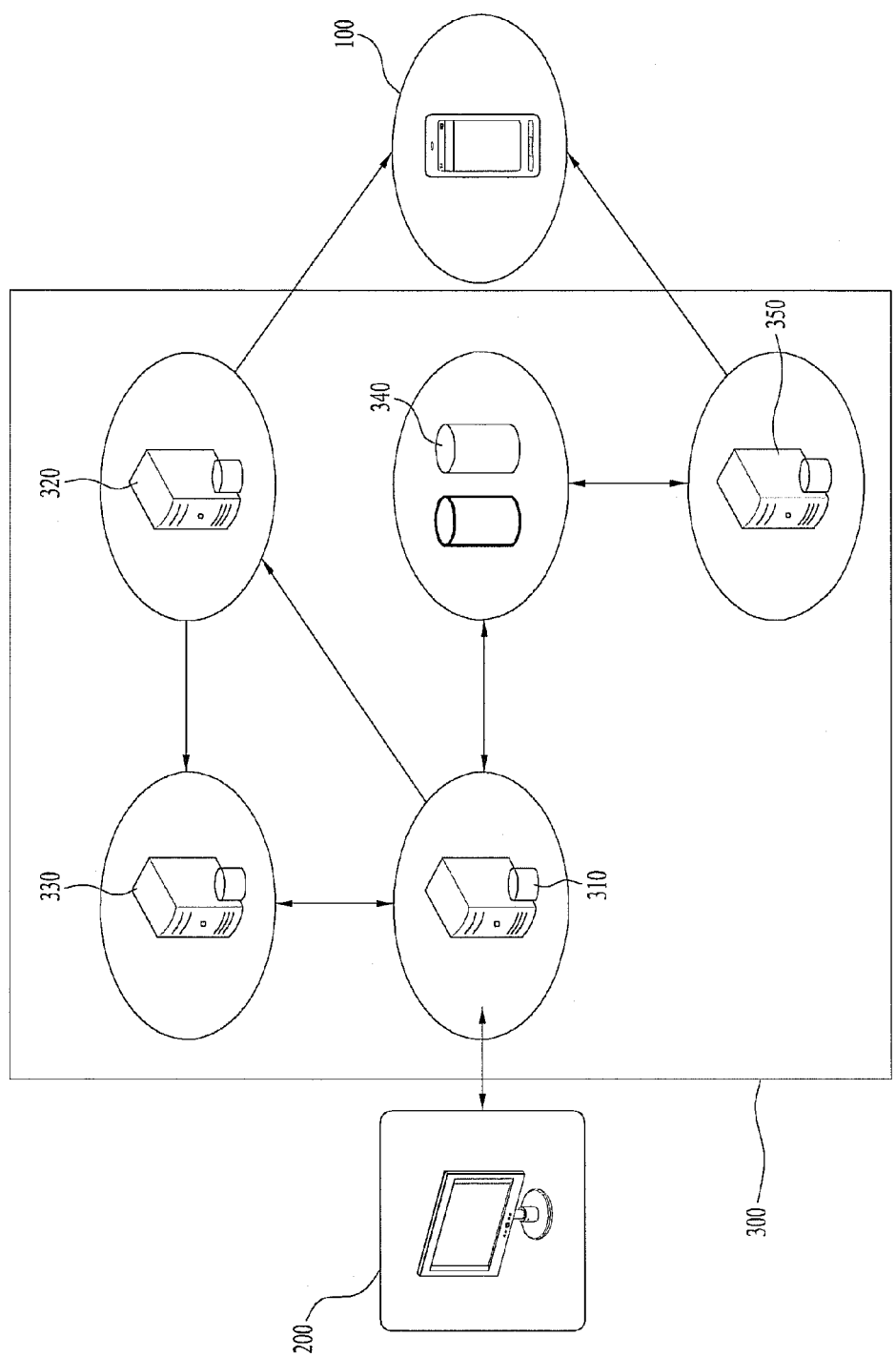
FIG. 3 is a diagram for one example of a configuration of a mobile communication system to implement embodiments of the present invention.

FIG. 3 is a diagram for one example of a configuration of a mobile communication system to implement embodiments of the present invention.

Referring to FIG. 3, a mobile communication system for implementing embodiments of the present invention may include a mobile terminal 100, a web terminal 200, a web server 310, a push server 320, a connection management server (hereinafter abbreviated CMS) 330, a database (DB) server 340 and a relay server 350. In the following description, the respective components are explained in detail.

First of all, the foregoing descriptions with reference to FIG. 1 and FIG. 2 exactly apply to the mobile terminal 100. The web terminal 200 is accessible to the web server 310 by wire/wireless via a web browser or application. If the web terminal 200 is provided with a display means and a command input means, it may include any kind of computer or terminal. The web server 310 may provide a webpage API (application programming interface) for mobile terminal security to the web terminal 200, query the connection management server 330 about an address of the push server 320, and read/record information in the database server 340. In particular, the webpage API for the mobile terminal security may include an interface prepared to control a mobile terminal security function of the present invention on a web browser or application activated by the web terminal 200. For this, it may be able to provide an interface configured to enable a user to select various security functions that can be activated or deactivated in a lost mobile terminal 100.

The push server 320, may play a role in delivering a security function related command requested by the web server 310 to the mobile terminal 100. In this case, the security function related command requested by the web server 310 preferably includes a command corresponding to a function selected by a user via an API provided by the web terminal 200. Moreover, a plurality of push servers 320 may be provided in a manner of geographically distributed.

The connection management server 330 acquires a server address of the push server 320 and/or a list of mobile terminals taken charge of by the corresponding push server from the push server 320 and then manages the acquired server address and/or the list. If the web server 310 queries the server address of the push server 320 in charge of the corresponding mobile terminal in order to deliver a command to a specific mobile terminal, the connection management server 330 may be able to inform the web server 310 of the queried server address.

The database server 340 may store a command for a security function requested to the web server 310 by a user, an execution result of the command and security related information (e.g., SIM card information, password, synchronization information, etc.) on the mobile terminal.

If the mobile terminal 100 makes a request for a command confirmation prior to executing the command delivered from the push server 320, the relay server 350 queries the database server 340 about the corresponding command and then makes a reply to the mobile terminal 100. Alternatively, the relay server 350 receives information on the command execution result from the mobile terminal 100 and then forwards it to the database server 340.

Meanwhile, a communication between the web server 310 and the web terminal 200 may follow the HTTP specifications. And, data exchanges may be performed via communications between other servers by TCP/IP (MQTT: MQ Telemetry Transport). The respective servers 310 to 350 are classified with reference to executable functions, by which the present invention may be non-limited. For instance, at least two functions may be performed by a single server or a single function may be performed by at least two servers, which is apparent to those skilled in the art.

In the following description, a sequence for performing a security related function of the mobile terminal through the above-mentioned components is explained.

In the following sequence, assume that program codes for the execution of a security function according to the present invention are loaded as an application and/or operating system (OS) on the mobile terminal 100. And, assume that the mobile terminal 100 must include the wireless communication unit 110 to communicate with the push server 320 and the relay server 350. Moreover, assume that information (e.g., ID and password for an access to a web server (i.e., web account information), SIM card information, information for mobile terminal security, etc.) for identifying a mobile terminal and a user is saved in the database server 340 in advance.

First of all, in case that a security function of a mobile terminal according to the present invention is necessary (e.g., if a mobile terminal is lost), a user accesses the web server 310 via the web terminal 200. In doing so, a login procedure may be requested for user confirmation/authentication. And, the web server 310 for the login information confirmation is the database server 340.

If the user selects an activation of a specific security function via the API provided by the web server 310, the web server 310 queries the connection management server 330 about an address of the push server 320 in charge of the corresponding mobile terminal 100 in order to deliver a execution command of the selected function. Having acquired the address of the push server 320, the web server 310 requests the push server 320 to deliver the execution command to the mobile terminal 100 and also requests the database server 340 to store the execution command.

In response to the request made by the web server 310, the push server 320 delivers the execution command to the mobile terminal 100. The mobile terminal 100 may directly perform an operation according to the corresponding execution command or may undergo a confirmation procedure. In case of undergoing the confirmation procedure, the mobile terminal 100 may query the relay server 350 about validity of the execution command. In response to the query from the mobile terminal 100, the relay server 350 requests the database server 340 to check whether the execution command queried by the mobile terminal 100 is identical to the execution command requested to be stored by the web server 310 (i.e., the command selected by the user via the webpage). Having received the confirmation of the command identity, the relay server 350 notifies it to the mobile terminal 100. The mobile terminal 100 then performs an operation in accordance with the corresponding execution command. Thereafter, the mobile terminal 100 transmits a result of the operation execution to the relay server 350 immediately or on the basis of event triggering. The relay server 350 forwards the execution result to the database server 340. The database server 340 pushes the execution result to the web server 310 by real time/periods. Alternatively, if there is a polling from the web server 310, the database server 340 may forward the execution result to the web server 310. The execution result forwarded to the web server 310 may be displayed on the web terminal 200 via API.

Except special cases, the above-mentioned command execution process may be universally applicable to the embodiments of the present invention.

Function for Providing Security

In the following description, detailed functions of providing security to a mobile terminal according to the present invention are explained with reference to FIG. 4.

Figure 4:
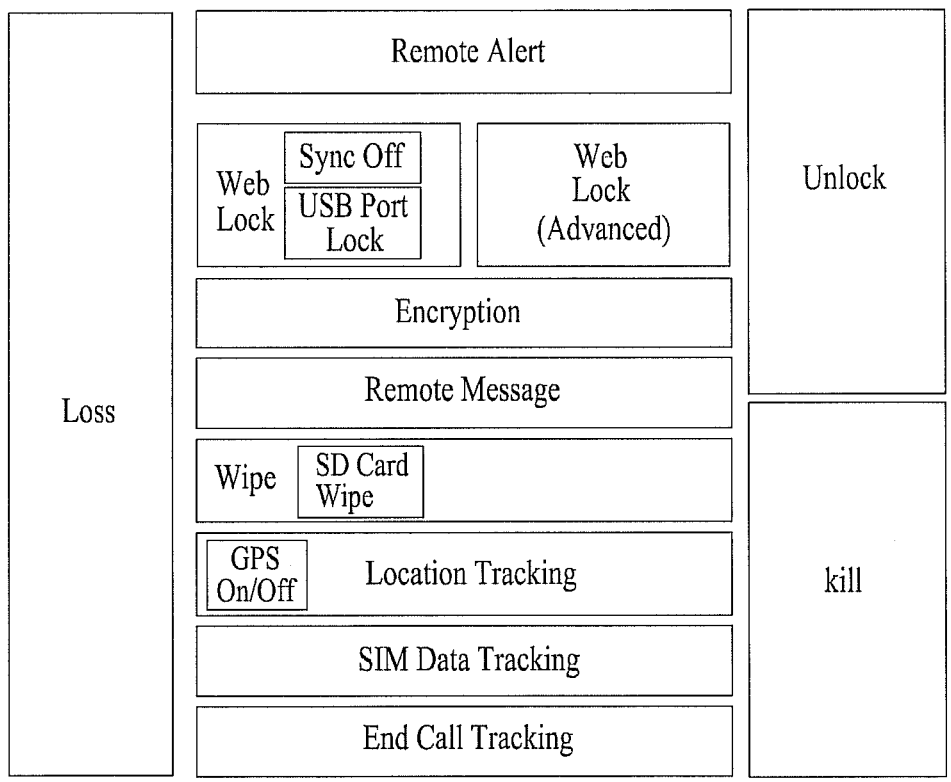
FIG. 4 is a block diagram of a security function executable in a mobile terminal according to one embodiment of the present invention.

FIG. 4 is a block diagram of a security function executable in a mobile terminal according to one embodiment of the present invention.

Referring to FIG. 4, a security function according to one embodiment of the present invention may be mainly divided into a loss step on a left side, a function executing step on a middle side, and an end step on a right side.

The loss step may mean a process for receiving API for controlling a security function in a manner that a user recognizes a loss and then accesses a web server via a web terminal.

The function executing step may mean a process executable prior to an end step of activating a kill function of canceling a security function finally activated in a mobile terminal or disabling a booting. And, the respective functions configuring the function executing step may be individually executed or at least two of the functions may be performed together.

In the following description, the respective functions configuring the function executing step are explained in detail. As mentioned in the foregoing description, each of the functions explained in the following description may be executed when an execution command matched to the corresponding function is received from the push server. In particular, if a user selects an execution command for a corresponding function from the web server 310 via the web terminal 200, the corresponding function can be executed in the mobile terminal.

First of all, a remote alert may mean a function of forcing a sound via the audio output unit 152 or a vibration via the haptic module 154 to be outputted from the mobile terminal 100 under a specific condition. This is to enable a user to perceive a location of the lost terminal 100 in a manner of stimulating a tactile sense with vibration or the auditory sense with a sound generated from vibration or outputted via the audio output unit. In particular, the vibration or sound may keep being generated for prescribed duration or by periods. An output pattern of the vibration or sound may be previously set in the mobile terminal or a user may directly select the output pattern from the API provided via the web server 310. In case that a user directly selects the output pattern, an output pattern information may be delivered to the mobile terminal 100 in a manner of being contained in an execution command transmitted from the push server 320. Moreover, the specific condition may include a location information or a time information. According to the location information, if a current location of the mobile terminal 100 acquired from the position location module 115 corresponds to a preset point, the remote alert function may be executed. When the present function is executed on the basis of location, if the remote alert function is set to operate at a location where a user of a lost mobile terminal resides, a sound or vibration is generated when a finder passes the corresponding location. Hence, it may be able to increase the possibility that the user may find the lost mobile terminal.

In the following description, a web lock function is explained. Once a web lock function is set up, at least one of functions of the mobile terminal may be restricted from being used. For instance, a function of restricting a file in the mobile terminal 100 from being viewed or a function of receiving an incoming call (or rejecting an incoming call) may be performed or a preset substitute screen may be displayed instead of a home screen of a mobile terminal. In this case, a function executable in an active web lock function may be displayed on the substitute screen. In order to cancel an active web lock function, a preset password may be inputted to a password input window displayed on the substitute screen or the like or a password may be inputted to an input means of the web terminal 200 via the API provided by the web server 310. In doing so, the password for canceling the web lock function may be encrypted and saved in the database server 340 and may be preferably different from a password for canceling a lock screen of the mobile terminal. In case that the password for canceling the web lock function is inputted via the user input unit 130 (e.g., a virtual keypad displayed on the touchscreen) of the mobile terminal, the inputted password is transmitted to the relay server 350. The relay server 350 then queries the database server 340 about verification of identity with another password previously saved in the database server 340. If the database server 340 confirms the identity between the two passwords, the relay server 350 notifies the confirmation of the identity to the mobile terminal 100, whereby the web lock set in the mobile terminal 100 can be cancelled.

If the password for canceling the web lock function is incorrectly inputted as many as a preset count, an advanced web lock function may be executed. Once the advanced web lock function is activated, it may be unable to further input the password for canceling the web lock in the mobile terminal. For instance, as the web lock function is activated, while a password input window is displayed on a substitute screen, if the advanced web lock function is activated, the password input window may disappear from the substitute screen.

Hence, if the advanced web lock function is executed once, the executed advanced web lock function can be cancelled by an input via the web server 310 only.

Meanwhile, when a web lock function (or an advanced web lock function) is executed, a sync-off function and a USB port lock function may be additionally executed as well. In this case, a sync function may mean that mutually stored data are synchronized between the mobile terminal 100 and the database server 340. If the sync-off function is executed, synchronization can be prevented. Therefore, new information is prevented from being transmitted to a lost mobile terminal from a database server or information saved in the database server is prevented from being updated with randomly modified information in the lost mobile terminal. The USB port lock function may mean a function of preventing a finder of a lost mobile terminal from arbitrarily accessing a file system of the lost mobile terminal via USB cable connection. In case of Android system, an access via ADB (Android data bridge) or a UMS (ultra mass storage) connection can be blocked. Therefore, a finder of a lost mobile terminal is prevented from gaining a root authority by hacking via ADB, reinstalling OS, or accessing an internal memory. Of course, this is to deactivate a data input/output function via USB port by software and may not block a power supply (i.e., a built-in battery charging) via USB port.

The aforementioned sync-off function and the aforementioned USB port lock function may be activated together when the web lock function is activated. The aforementioned sync-off function and the aforementioned USB port lock function may be activated together when the advanced web lock function is activated. The aforementioned sync-off function and the aforementioned USB port lock function may be activated in different steps, respectively.

In the following description, an encryption function is explained. The encryption function encrypts data saved in the memory 160 of the mobile terminal to prevent internal data from leaking in case that a finder of the lost mobile terminal unlocks such a lock mechanism as a web lock and the like. Encryption may be performed by a preset encryption algorithm. In particular, a while file may be encrypted. In case of a large-sized file, it may be able to encrypt a file header only. A range of a file to be encrypted may be set via web API or may be previously set in the mobile terminal 100.

In the following description, a remote message function is explained. The remote message function means a function of displaying a message, which is inputted by a user of a lost mobile terminal 100 via web API, on a display unit of the lost mobile terminal 100. Through this function, the user of the lost mobile terminal 100 may be able to deliver the message to a finder of the lost mobile terminal 100. In particular, the present function may be displayed on a substitute screen provided by a web lock function when used together with the web lock function.

A memory wipe function means a function of deleting a message storage list in a specific range. The present function may be mainly classified into two steps. In the $1^{st}$ step, a user file may be deleted while a system setting or application remains intact. In the $2^{nd}$ step, after a system has been reset like a factory reset, rebooting may be performed in web lock mode. So to speak, once the $1^{st}$ step wipe is executed, a system file region (e.g., internal memory) for storing system files including OS and the like is maintained intact but a file saved in a file region (e.g., SD memory card), in which a user is able to record and delete files freely, may be deleted only.

In the following description, a location tracking function is explained. First of all, according to the location tracking function, a lost mobile terminal 100 acquires its location information using the wireless communication module 110 and then enables the acquired location information to be displayed on the web terminal 200 via the web server 310 by transmitting the acquired location information to the relay server 350. In doing so, the mobile terminal 100 activates the mobile communication module 112 or the wireless internet module 113, acquires identification information (e.g., Cell ID, BSID, MAC address of AP, IP, etc.) of 3G or Wi-Fi network via the activated mobile communication module 112 or the activated wireless internet module 113, and then transmits the acquired identification information to the relay server 350. Moreover, the mobile terminal 100 may be able to GPS coordinates acquired via the position location module 115 to the relay server 350. Of course, when an execution command for the location tracking function is received from the push server 320, if the GPS or Wi-Fi module is inactive, the controller 180 may be able to activate the corresponding module irrespective of settings (i.e., setup override).

Moreover, the mobile terminal 100 activates the mobile communication module 112 or the wireless internet module 113 and the position location module 115 in parallel and then transmits acquired informations to the relay server 350 in order of acquisition. Alternatively, the mobile terminal 100 may be able to activate the corresponding modules in order indicated by an execution command received from the push server 320. Besides, the present function may be configured to acquire and transmit location information by periods when an execution command for one of functions for providing security according to the present invention is received as well as a triggering via web.

In the following description, an SIM data tracking function is explained. First of all, an SIM or USIM card contains information for subscriber identification and may be generally connected to the mobile terminal via the interface unit 170. After an execution command for one of functions for providing security according to the present invention has been received, if the controller 180 detects that SIM card is replaced, the controller 180 may be able to transmit information (e.g., phone number, SIM card unique number, IMSI (international mobile subscriber identity), etc.) of the replaced card to the relay server 350.

In the following description, an end call tracking function is explained. If an incoming call after execution of a web lock function is not ended due to a network situation (e.g., call attempt time expiration, etc.) [i.e., a call rejection menu selection, a power-off in the course of receiving a call, a battery detachment in the course of receiving a call, etc.], the present function means a function of transmitting this fact to the relay server. Through the present function, a user of a lost mobile terminal may be able to indirectly determine a return intention of a finder of the lost mobile terminal. In order to provide the present function more efficiently, while a web lock is active, an incoming call screen may be provided with a substitute screen for providing limited functions (e.g., a call reception, a call rejection, etc.). On this substitute screen, in order to protect personal information, a caller is represented as a number only instead of a name saved in a phonebook despite the number is saved in the phonebook or the caller number may not be displayed at all. Of course, the controller 180 may be able to transmit an incoming call log and/or received text messages after execution of a web lock function to the relay server 350 as well as the fact of the reception/rejection. And, the controller 180 may be able to delete transmission history.

Finally, a kill function may mean a function of disabling a booting itself by deleting a booting related file or overwriting invalid data on the booting related file. If there is no hope for a user of a lost mobile terminal to recover the lost mobile terminal, this function may be usable to lure a finder of the lost mobile terminal into a service center.

In the following description, a process for executing the functions described with reference to FIG. 4 and a configuration of executing the corresponding function on a display unit of a mobile terminal are explained in detail with reference to FIGS. 5 to 16.

Web Lock

Figure 5:
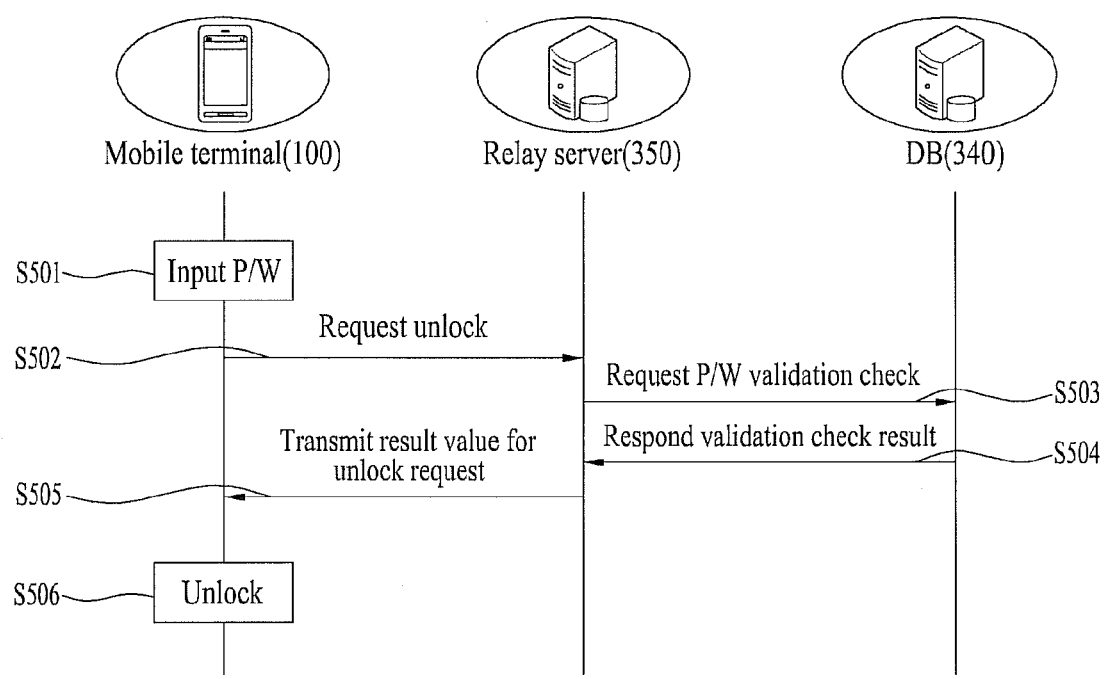
FIG. 5 is a flowchart of a procedure for canceling an active web lock function from a mobile terminal according to one embodiment of the present invention.

FIG. 5 is a flowchart of a procedure for canceling an active web lock function from a mobile terminal according to one embodiment of the present invention.

In FIG. 5, assume that the mobile terminal 100 receives a web lock function execution command and that a password inputtable substitute screen is displayed on the touchscreen 151 according to the reception.

Referring to FIG. 5, a finder inputs a password to unlock a web lock via the touchscreen of the mobile terminal 100 [S501].

The controller 180 transmits the inputted password to the relay server 350 to make a request for a web lock cancellation [S502]. In doing so, the password information may be encrypted and transmitted for security.

The relay server 350 transmits the received password information to the database server 340 and then queries the database server 340 about a validity check, i.e., whether the transmitted password information is identical to a password saved in a database (DB) [S503].

Subsequently, the database server 340 transmits a password comparison result to the relay server 350 [S504]. The relay server 350 then transmits the password comparison result to the mobile terminal 100 [S505].

If the controller 180 receives a response indicating that the password is valid from the relay server 350, the controller 180 cancels the web lock function [S506].

Figure 6:
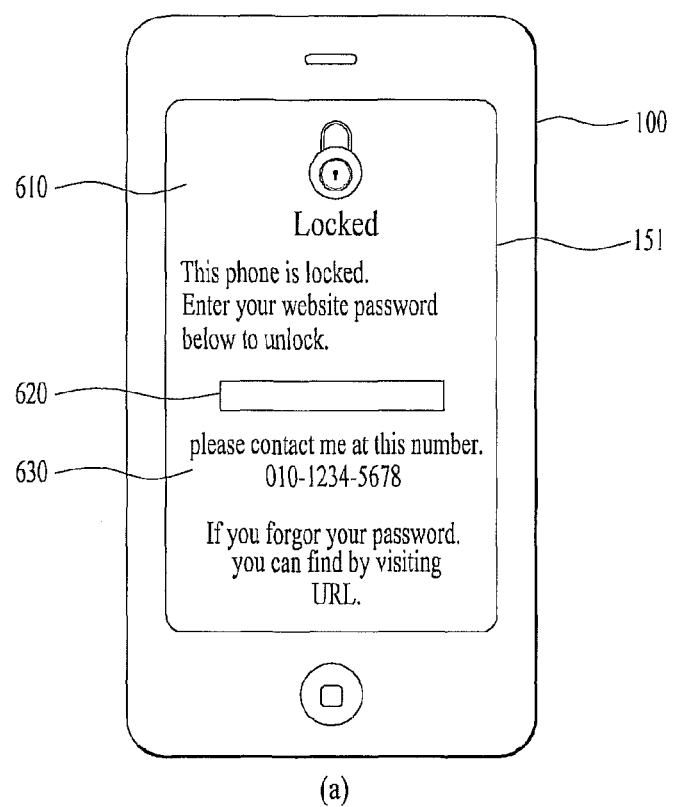
FIG. 6 is a diagram for one example of a web lock substitutive screen and a web lock canceling screen according to one embodiment of the present invention.
Figure 6:
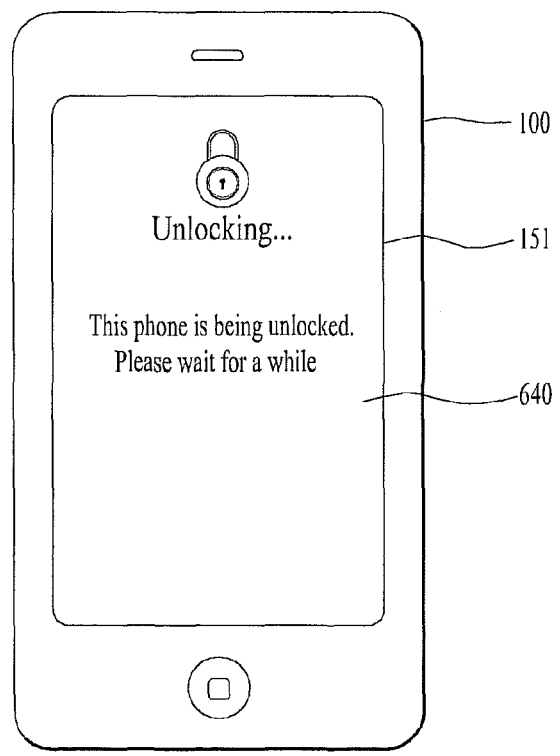

FIG. 6 is a diagram for one example of a web lock substitutive screen and a web lock canceling screen according to one embodiment of the present invention.

In FIG. 6, assume that the mobile terminal 100 receives a web lock function execution command and that a password inputtable substitute screen is displayed on the touchscreen 151 according to the reception.

Referring to FIG. 6(*a*), a visual effect 610 indicating that a web lock function is executed, a password input window 620 for unlocking a web lock, and a preset message 630 (e.g., user's contact information, etc.) are displayed on the substitute screen. If the web lock canceling process described with reference to FIG. 5 is completed, the web lock can be unlocked while a text 640 indicating the web lock cancellation is displayed.

Meanwhile, in case that a basic lock is previously set in the mobile terminal, the aforementioned substitute screen may be directly displayed by ignoring the basic lock function or may be displayed after cancellation of the basic lock. In this case, the basic lock may mean a security function of unlocking by inputting a password or a specific touch pattern set for the mobile terminal itself for the purpose of providing security or preventing touchscreen malfunction before a screen last used by a user or a background screen (e.g., a standby screen, a home screen, etc.) is entered.

As mentioned in the foregoing description with reference to FIG. 4, in a manner of using a web lock dedicated web password different from a security system (e.g., a password set for a terminal, a touch pattern set for a terminal, etc.) of a mobile terminal, the password is saved not in the terminal but in the server, whereby security can be enhanced. Moreover, the password set for the mobile terminal itself may be found through a password search function provided via web API despite that a user fails in memorizing the password. As the preset web password is too simple to be vulnerable to hacking, it may be able to change a password via the web API after the loss of the mobile terminal. Besides, since a web lock cancellation password is saved not in the mobile terminal but in the database server 340, the terminal may be able to reflect a password changed on web by real time. Since the password comparison result is notified instead of downloading the password to the mobile terminal, it may be able to cope with the hacking more effectively.

USB Port Lock Function

In the following description, a USB port lock function is explained in detail with reference to FIGS. 7 to 9.

Figure 7:
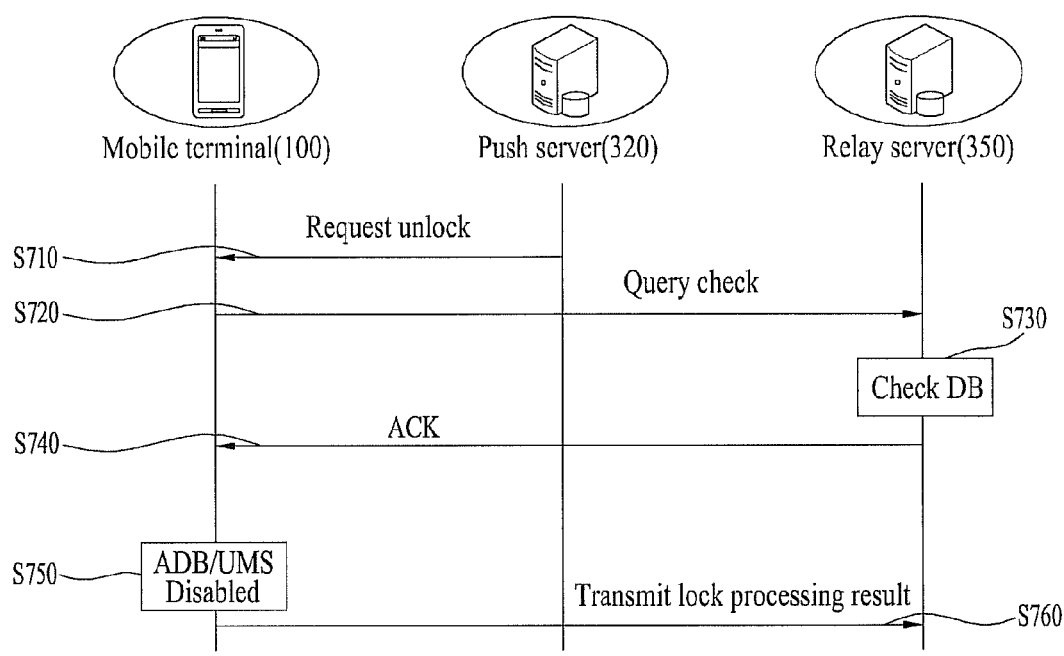
FIG. 7 is a flowchart of a procedure for activating a USB port lock function in a mobile terminal according to one embodiment of the present invention.

FIG. 7 is a flowchart of a procedure for activating a USB port lock function in a mobile terminal according to one embodiment of the present invention.

Referring to FIG. 7, if a user selects USB port lock execution via web API, a USB port lock execution command is delivered to the mobile terminal 100 from the push server 320 [S710].

In order to verify validity of the command, the mobile terminal 10 queries the relay server 350 about the execution command check [S720]. The relay server 350 then inquires the database server 340 about the execution command validity correspondingly [S730].

As a result of the check, if the command is valid, the relay server 350 informs the mobile terminal 100 of the validity [S740]. Subsequently, the mobile terminal 100 executes a USB port lock function [S750] and then transmits a corresponding result to the relay server 350 again [S760].

Figure 8:
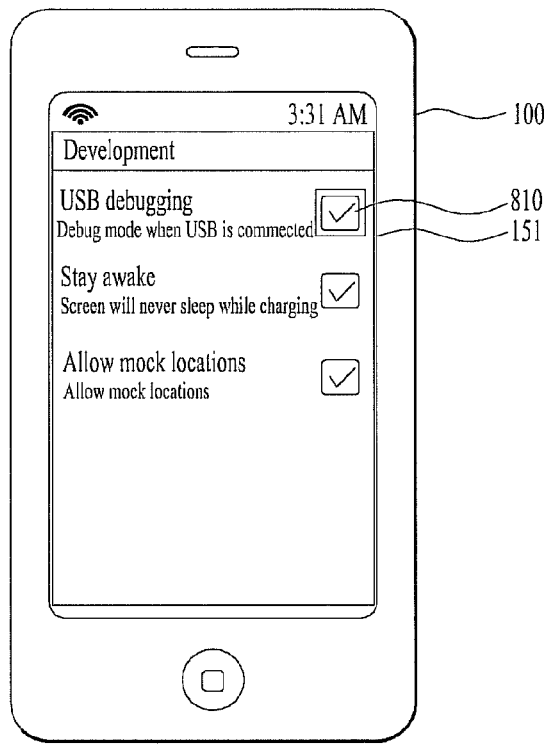
FIG. 8 is a diagram for one example of setting an ADB function and a UMS function as targets of a USB port lock in a mobile terminal according to one embodiment of the present invention.
Figure 8:
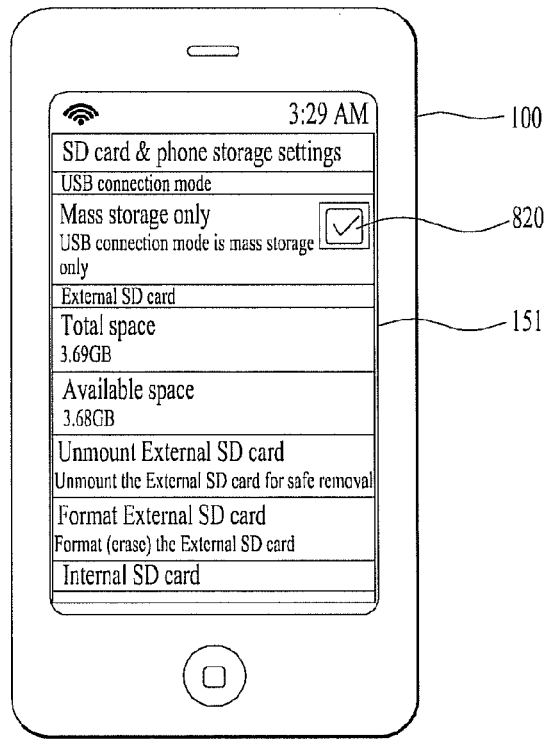

FIG. 8 is a diagram for one example of setting an ADB function and a UMS function as targets of a USB port lock in a mobile terminal according to one embodiment of the present invention.

Referring to FIG. 8, assume a USB related menu in a configuration setting menu of general Android OS. Referring to FIG. 8(*a*), a check box 810 for selecting or canceling a USB debugging function via a prescribed menu depth is displayed on the touchscreen 151 of the mobile terminal. Referring to FIG. 8(*b*), a check box 820 for selecting or canceling a UMS (mass storage) function via a prescribed menu depth is displayed on the touchscreen 151 of the mobile terminal. A is able to prevent data exchange via USB port by disabling all functions irrespective of setup statuses of the corresponding functions in case of the loss of the mobile terminal 100.

In particular, ADB is disabled as soon as a USB port lock is executed, whereby a file extraction via root authority acquisition (i.e., rooting) can be prevented. Moreover, since ADB command transmission is not available, it may be able to basically prevent a finder of the lost mobile terminal from attempting to hack the lost mobile terminal. Moreover, UMS is disabled as soon as the USB port lock is executed, whereby data of a memory (mass storage) for user data storage can be protected.

As mentioned in the foregoing description, since the present function is executed together with the web lock function, it is impossible to enter the configuration setting menu shown in FIG. 8 by a substitute screen displayed according to the execution of the web lock function. Therefore, it is impossible to arbitrarily cancel the present function in the mobile terminal, whereby security can be enhanced.

The present function may be cancelled when the web lock is cancelled. Alternatively, the present function may be individually cancelled by a function cancel selection made by a user via web API.

Figure 9:
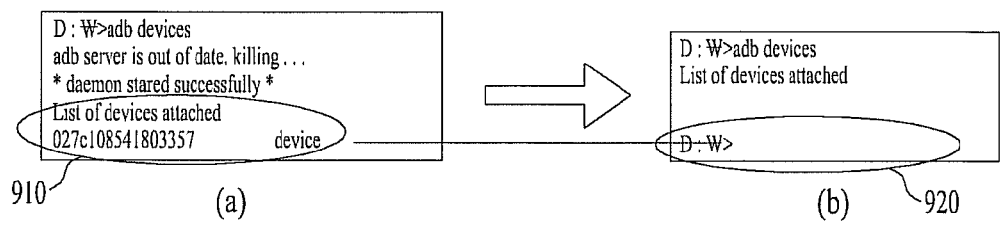
FIG. 9 is a diagram of a result screen outputted to a display of a computer having attempted a USB connection after activation of a USB port lock function in a mobile terminal according to one embodiment of the present invention.
Figure 9:
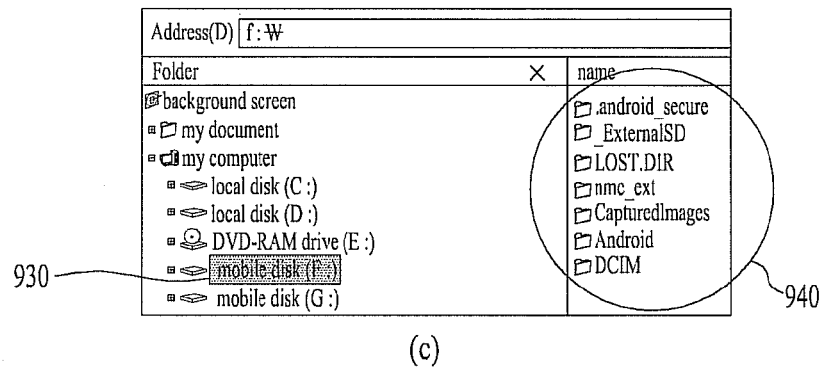
Figure 9:
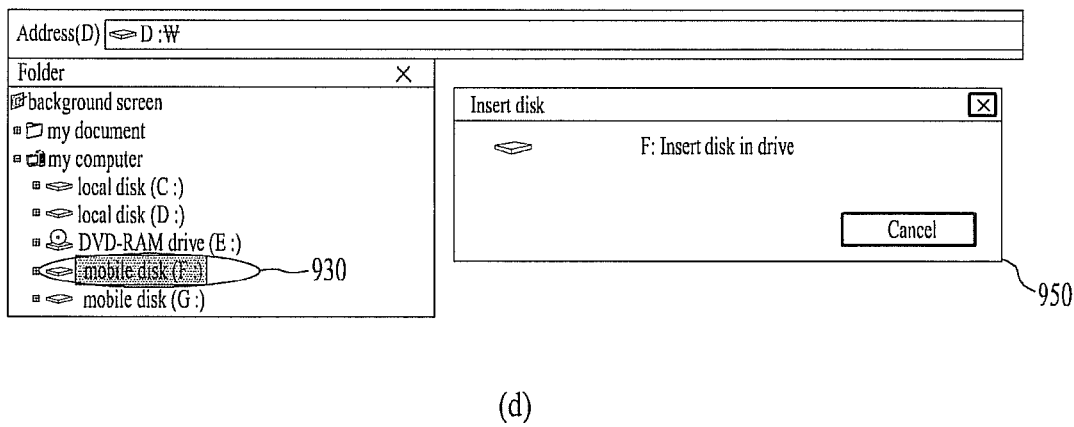

FIG. 9 is a diagram of a result screen outputted to a display of a computer having attempted a USB connection after activation of a USB port lock function in a mobile terminal according to one embodiment of the present invention.

Referring to FIG. 9, when a USB port lock is not executed, after a mobile terminal has been connected via ADB, if an ADB command (adb devices) for displaying a recognized device is inputted to a computer, an identification information 910 of the mobile terminal is displayed [FIG. 9(a)]. On the contrary, when a USB port lock is executed, even if a computer and a mobile terminal are physically connected with each other via USB cable, since ADB function is disabled, nothing 920 is displayed on the computer to indicate that the mobile terminal is not recognized [FIG. 9(b)].

In case of UMS, when a USE port lock is not executed, if a mobile terminal is connected with a computer via USB cable, the mobile terminal is recognized as a mobile disk 930 by the computer and internal data 940 are displayed. Yet, when the USB port lock is executed, an absence 950 of a disk is displayed on the computer [FIG. 9(d)].

Sync-Off Function

In the following description, a sync-off function is explained in detail with reference to FIG. 10 and FIG. 11.

As mentioned in the foregoing description, a sync-off function basically prevents personal informations from entering a lost phone by turning off an auto-sync function together with an execution of a web lock function. In case that a finder of the lost phone deletes or edits data saved in a mobile terminal by hacking, the sync-off function may prevent personal information on web from being modified.

Figure 10:
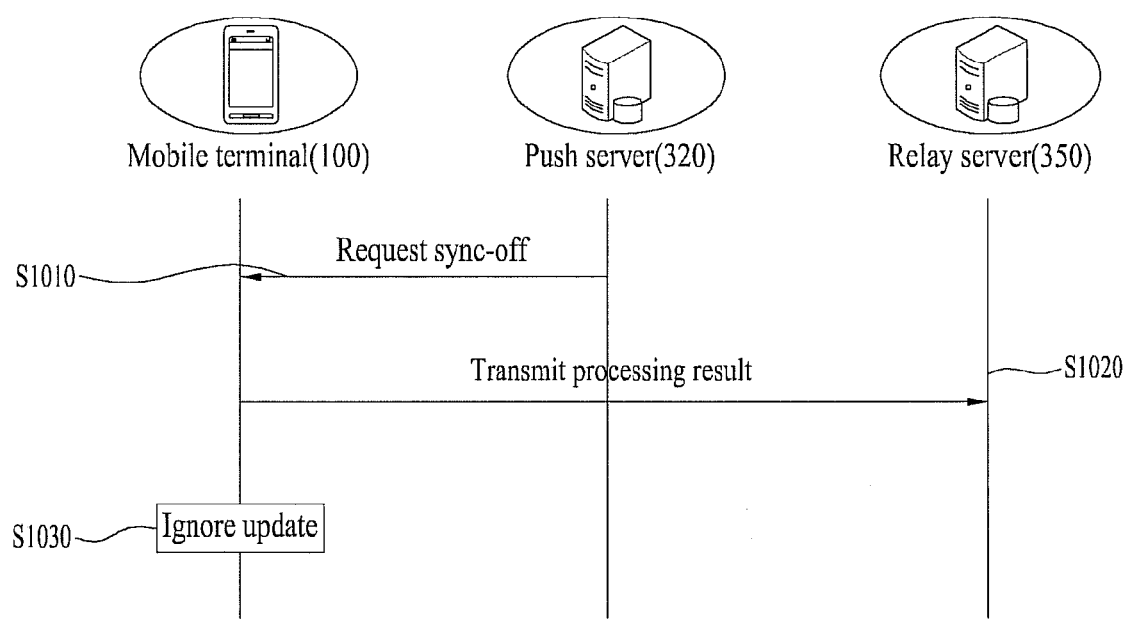
FIG. 10 is a diagram of a procedure for activating a sync-off function in a mobile terminal according to one embodiment of the present invention.

FIG. 10 is a diagram of a procedure for activating a sync-off function in a mobile terminal according to one embodiment of the present invention.

Referring to FIG. 10, if a user selects a sync-off lock execution via web API, a sync-off execution command is delivered to the mobile terminal 100 from the push server 320 [S810].

The controller 180 of the mobile terminal 100 executes the sync-off function in response to the sync-off execution command [S1020] and then transmits a corresponding result to the relay server 350 [S820].

Thereafter, even if personal information on a user is updated in the mobile terminal or the database server, auto-sync is not executed [S830].

Of course, the mobile terminal 100 queries the relay server 350 about the execution command check for the validity verification of the command before executing the sync-off function. The relay server 350 inquires the database server 350 about the execution command validity and then feeds back a result of the inquiry to the mobile terminal 100 [not shown in the drawing].

Figure 11:
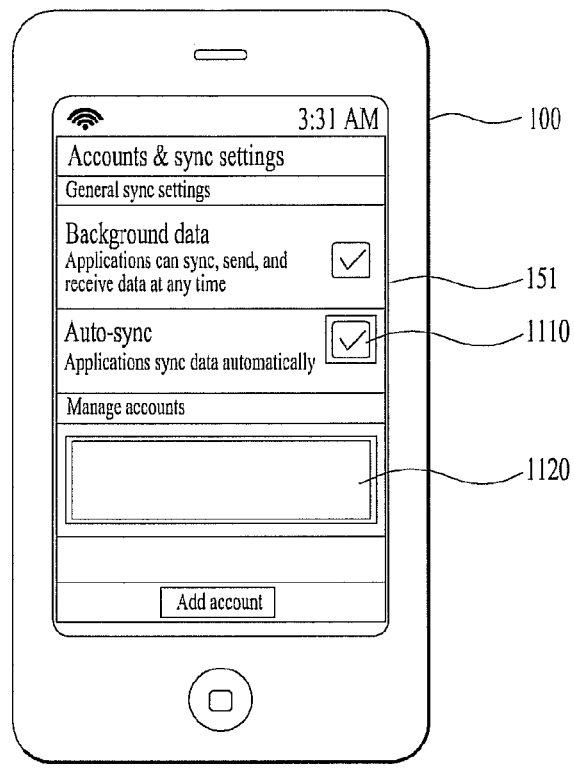
FIG. 11 is a diagram for one example of setting a sync-off function in a mobile terminal according to one embodiment of the present invention.
Figure 11:
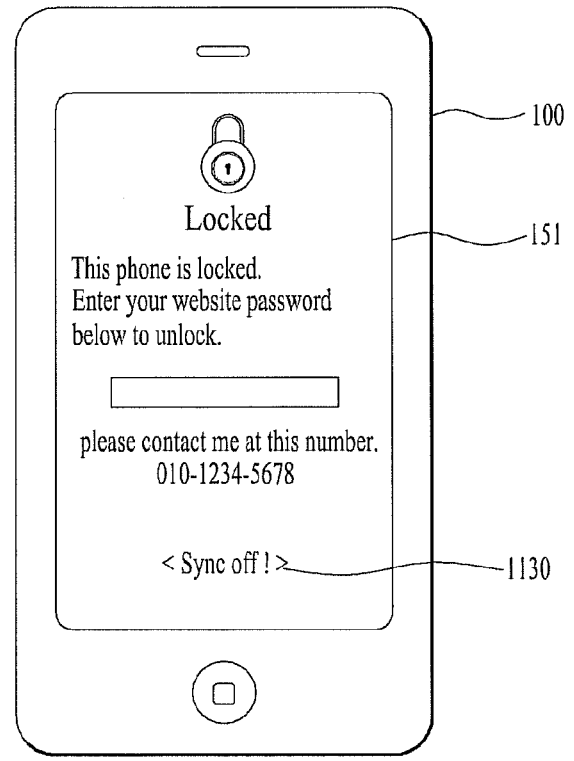

FIG. 11 is a diagram for one example of setting a sync-off function in a mobile terminal according to one embodiment of the present invention.

Referring to FIG. 11(a), a check box 1110 for selecting or canceling an auto-sync function via a prescribed menu depth and an input box 1120 for inputting a web account information to be synchronized may be displayed. In this case, the sync-off function disables the auto-sync function irrespective of a setup status of the auto-sync function at that time of the loss, thereby preventing synchronization from being automatically performed.

As mentioned in the foregoing description, since the present function is executed together with the web lock function, it is impossible to enter the configuration setting menu shown in FIG. 9(a) by a substitute screen displayed according to the execution of the web lock function. Therefore, it is impossible to arbitrarily cancel the present function in the mobile terminal, whereby security can be enhanced. In doing so, if the sync-off function is executed, a text 1130 may be displayed on the substitute screen to indicate this state [FIG. 9(b)].

As the aforementioned USB port lock function and the aforementioned sync-off function are side functions that can be simultaneously executed, although a separate execution command is not delivered, if a web lock execution command is received, the controller 180 of the mobile terminal 100 may be able to execute at lease one of them in accordance with a setting.

SIM Data Tracking

In the following description, an SIM data tracking function is explained in detail with reference to FIG. 12.

Figure 12:
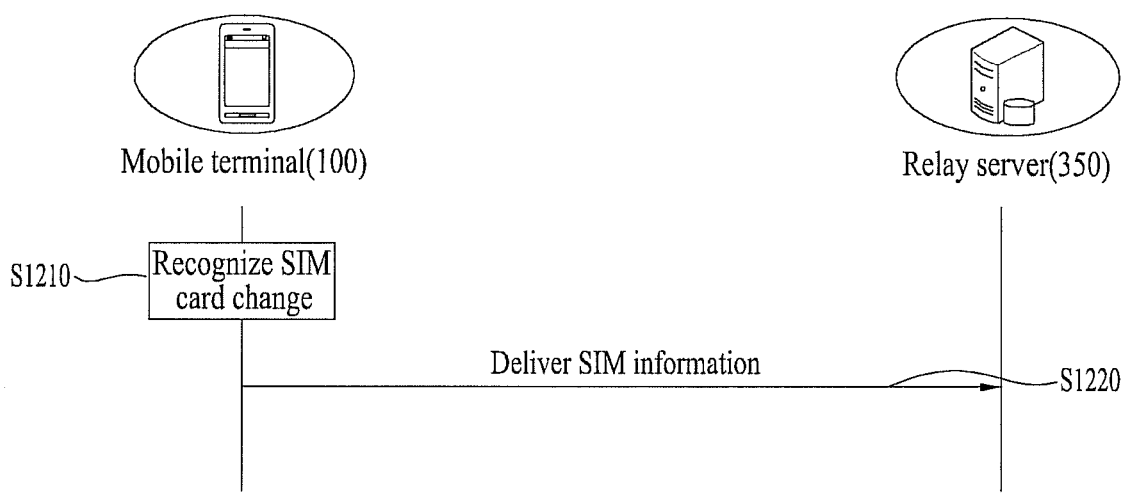
FIG. 12 is a flowchart for one example of activating an SIM data tracking function according to one embodiment of the present invention.

FIG. 12 is a flowchart for one example of activating an SIM data tracking function according to one embodiment of the present invention.

Since an execution command delivery process and an execution process in FIG. 12 are similar to the aforementioned steps S710 to S750, their details shall be omitted for clarity of the following description.

Referring to FIG. 12, after the SIM data tracking function has been executed, if the controller 180 of the mobile terminal 100 recognizes that an SIM card has been changed [S1210], the controller 180 may deliver the changed card information to the relay server 350 [S1220].

If a finder of the mobile terminal changes the SIM card, the controller 180 transmits a changed SIM card information, e.g., a new phone number to a server, thereby enabling a new number use log of the lost terminal to keep being tracked. In particular, a user of the lost terminal acquires the changed number and then make a phone call to the acquired number to recover the lost mobile terminal. If it is not possible to read the phone number from the changed SIM card, the controller 180 may enable a user to estimate the phone number later by reading and transmitting IMSI value.

End Call Tracking

In the following description, an end call tracking function is explained in detail with reference to FIG. 13 and FIG. 14. The end call tracking function may be executable together with or separately from a web lock. If the end call tracking function is executed separately, since an execution command delivery process and an execution process are similar to the aforementioned steps S710 to S750, their details shall be omitted for clarity of the following description.

Figure 13:
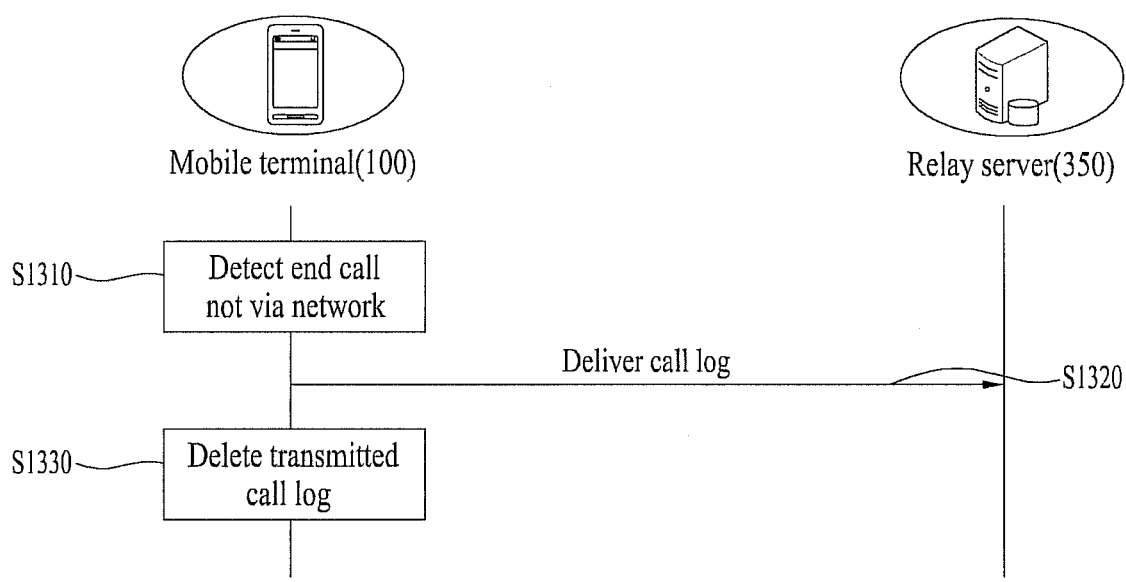
FIG. 13 is a flowchart for one example of a process for activating an end call tracking function according to one embodiment of the present invention.

FIG. 13 is a flowchart for one example of a process for activating an end call tracking function according to one embodiment of the present invention.

Referring to FIG. 13, after a end call tracking function has been executed, if the controller 180 detects an end call (i.e., a finder's intentional incoming call rejection) independent from a network [S1310], the controller 180 transmits a call log containing a cause of the end call, a sender information, a call reception time information and the like to the relay server 350 [S1320]. Having completed the transmission of the call log, the controller 180 may delete the corresponding call log from the memory 160 to prevent information leakage in the future [S1330]. Through this, in case that a finder of the mobile terminal intentionally rejects a call, the controller 180 informs a user of the mobile terminal of the finder's intentional call rejection to help the user take follow-up measures.

Meanwhile, as mentioned in the foregoing description, if the web lock function is executed, the substitute screen is provided and a substitute call screen (Call UI) may be displayed as well in the event of an incoming call. This is described with reference to FIG. 14 as follows.

Figure 14:
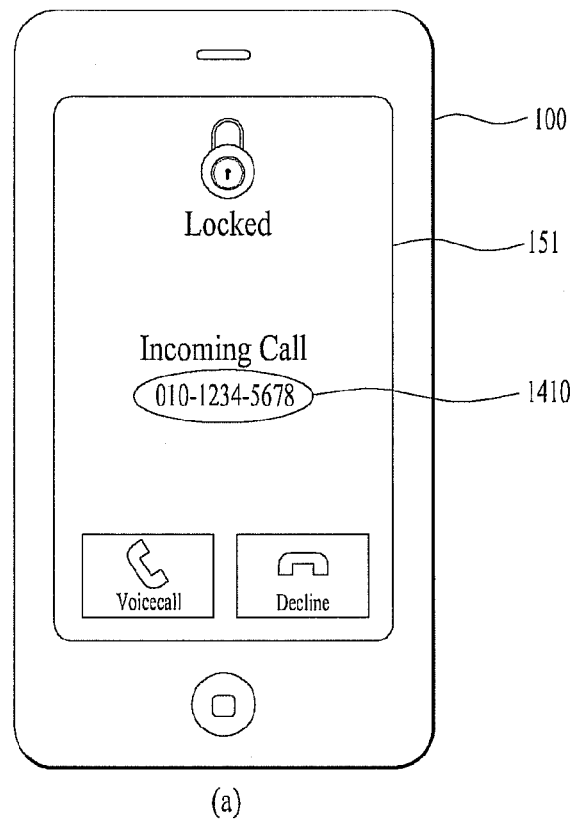
FIG. 14 is a diagram for one example of displaying a substitute call screen on a mobile terminal according to one embodiment of the present invention.
Figure 14:
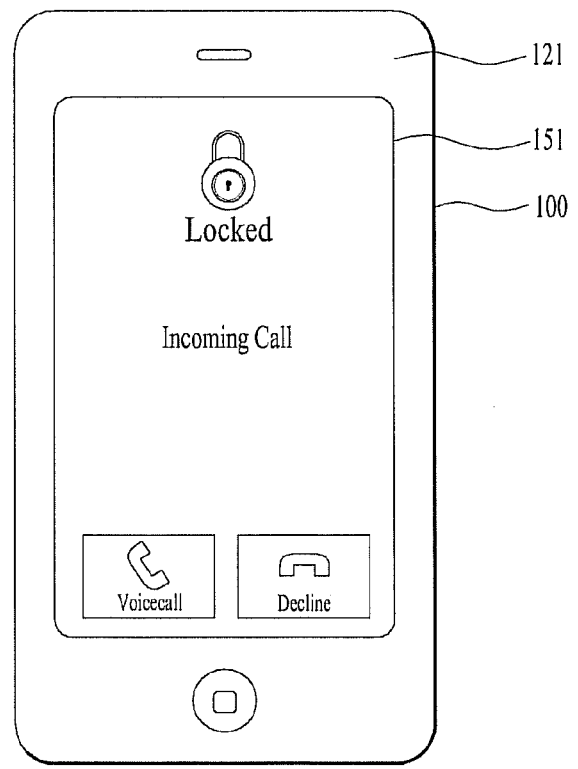

FIG. 14 is a diagram for one example of displaying a substitute call screen on a mobile terminal according to one embodiment of the present invention.

Referring to FIG. 14, after an end call tracking function has been executed, if there is an incoming call, a substitute call screen (Call UI) may be displayed on the touchscreen 151 of the mobile terminal 100 [FIG. 14(a)]. In doing so, in order to force a finder of the mobile terminal 100 to answer or reject the incoming call, a touch menu is limitedly provided. Moreover, even if a phone number of a sender is saved in a phonebook for the sender's information protection, the number 1410 may be displayed only instead of a name on the phonebook. Of course, the phone number of the sender may not be displayed at all [FIG. 14(b)].

Advanced Web Lock

Figure 15:
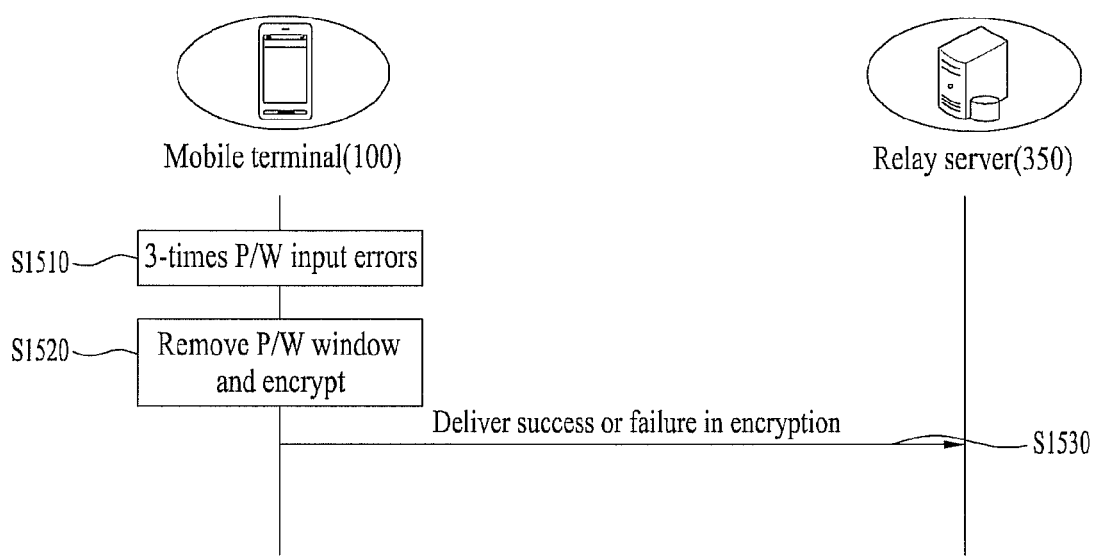
FIG. 15 is a flowchart for one example of a process for activating an advanced web lock function according to one embodiment of the present invention.

FIG. 15 is a flowchart for one example of a process for activating an advanced web lock function according to one embodiment of the present invention.

Referring to FIG. 15, when a web lock function is already executed, if the controller 180 detects that a password is incorrectly inputted to a password input window displayed on a substitute screen several times over a preset count (e.g., 3) [S1510], the controller 180 removes the password input window from the substitute screen and may then perform an encryption function [S1520]. Thereafter, the controller 180 may transmit information indicating that an advanced web lock is executed and information indicating encryption success/failure to the relay server 350 [S1530].

Figure 16:
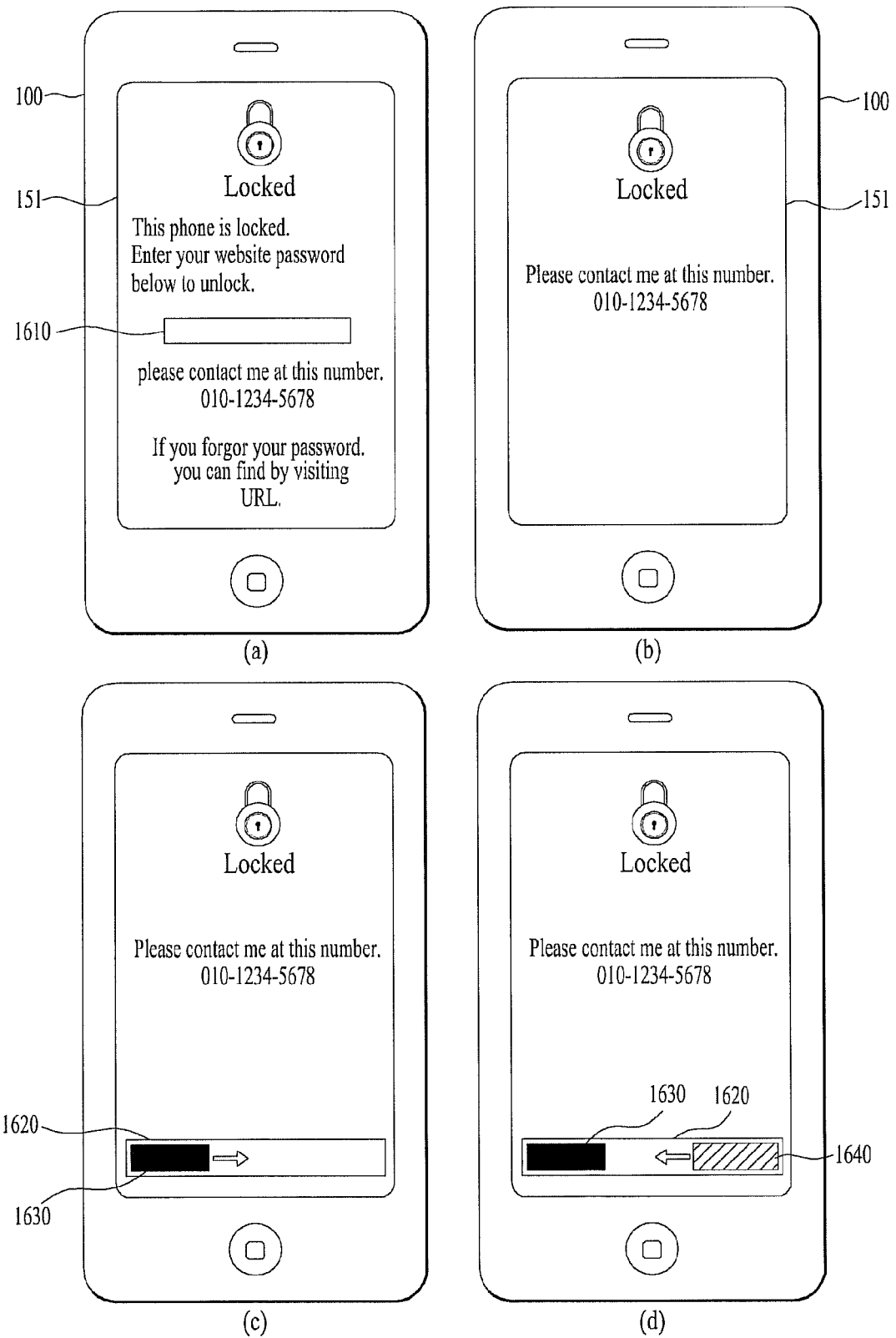
FIG. 16 is a diagram for one example of activating an advanced web lock function in a mobile terminal according to one embodiment of the present invention.

FIG. 16 is a diagram for one example of activating an advanced web lock function in a mobile terminal according to one embodiment of the present invention.

Referring to FIG. 16, as a web lock function is executed, a substitute screen containing a password input window 1610 is displayed on the touchscreen 151 of the mobile terminal 100 [FIG. 16(a)]. If a password in incorrectly inputted preset times, an advanced web lock is executed and the password input window disappears from the substitute screen [FIG. 16(b)].

Meanwhile, only if a slide bar 1639 is pushed by a touch & drag input within a predetermined region 1620 of a substitute screen in opposite direction to prevent malfunction of the touchscreen, a password input window 1630 may be displayed [FIG. 16(c)]. In this case, as an advanced web lock function is executed, referring to FIG. 16(d), if the slide bar 1630 is moved to an opposite side 1640 by a touch & drag input, the slide bar 1630 may return to its original position instead of displaying the password input window.

Meanwhile, as mentioned in the foregoing description, the advanced web lock function may be disabled if a correct password is inputted to web API. If there is a file deleted by a finder or a file damaged in the course of an encryption canceling process, the controller 180 downloads data saved in the server via the auto-sync function and may be then able to restore the deleted or damaged file automatically.

Location Tracking Function

In the following description, a location tracking function according to the present invention is explained. A location tracking technology proposed by the present invention may be mainly classified into three kinds of methods. According to the $1^{st}$ method, a result value is represented in accordance with a type and order of a location tracking technique. According to the $2^{nd}$ method, a location tracking request made by a user via web is processed more efficiently. According to the $3^{rd}$ method, a current location is more accurately acquired by verifying validity in accordance with a time of a location tracking result value.

The $1^{st}$ method is described as follows.

First of all, a location tracking method according to the present embodiment may adopt a technique of using a wireless network (or a mobile network) or a coordinated acquisition technique of using a global positioning system (GPS). Generally, in case that a location tracking function is performed via the mobile network, this may have accuracy lower than that of the GPS using technique. On the contrary, although the GPS using technique may have high accuracy, if a mobile terminal to be tracked is located in an indoor place and/or a GPS shadow region, the probability of the coordinated information acquisition failure is high. Hence, a method of providing higher success probability and accuracy is required for a location positioning service quality.

To this end, according to the present embodiment, a terminal is requested to perform the location tracking using both of the two techniques and a corresponding result is displayed on web in accordance with a type and order of information received from the terminal. In particular, if a location information using the mobile network is preferentially acquired from the terminal, the acquired location information is outputted via web and a reception of a location information using the PGS is then awaited. Thereafter, if the location information using the GPS is received, the terminal location information outputted to the web is updated. On the contrary, if the location information using the GPS is preferentially received, the present location tracking procedure may be ended. This is because the location information using the mobile network having a relatively low accuracy is not necessary at the timing point of acquiring the location information using the GPS. In the following description, the above-described procedure is explained in aspect of mobile terminal/servers with reference to FIG. 17.

Figure 17:
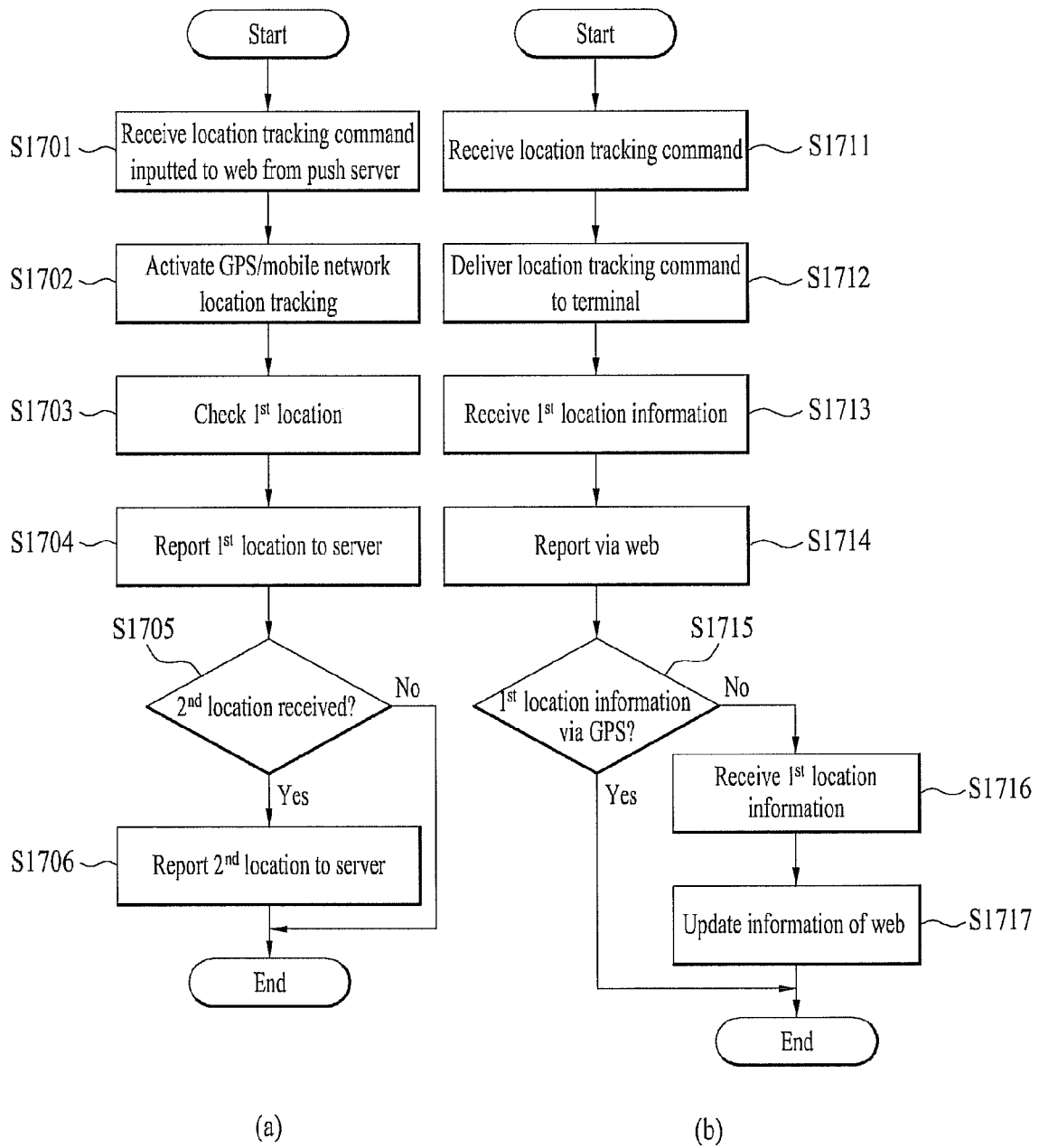
FIG. 17 is a flowchart for one example of a location tracking method in consideration of a tracking system and an acquisition order according to one embodiment of the present invention.

FIG. 17 is a flowchart for one example of a location tracking method in consideration of a tracking system and an acquisition order according to one embodiment of the present invention.

In FIG. 17, FIG. 17(a) illustrates an operation of a mobile terminal and FIG. 17(b) illustrates operations of severs (i.e., a push server, a web server and a relay server) except the mobile terminal.

Referring to FIG. 17(a), if a user inputs a tracking request command via the web server, a terminal receives a location tracking command from the push server 320 [S1701]. The controller 180 activates the position location module 115 for acquiring a location information via GPS and a related wireless communication module for acquiring a location information via a mobile network in accordance with the received command [S1702]. In this case, the related wireless communication module for acquiring the location information via the mobile network may include at least one of the mobile communication module 112, the wireless Internet module 113 and the short range communication module 114.

Once the location informations are acquired via the respective acquisition techniques, the controller 180 sequentially transmits the acquired location informations to the relay server in order of the acquisitions [S1703 to S1706]. In doing so, the controller 180 may be able to transmit an identification information indicating the location information acquiring technique (e.g., GPS, mobile network, etc.) to the relay server together with the corresponding location information.

Referring to FIG. 17(b), if a user inputs a tracking request command via the web server 310 [S1711], the push server 320 transmits a location tracking command to the mobile terminal [S1712]. Thereafter, if a $1^{st}$ location information is received from the mobile terminal via the relay server [S1713], the relay server 350 delivers it to the web server 310. The web server 310 then enables the 1st location information to be displayed on the web terminal 200 of the user [S1714].

In doing so, if the 1st location information is the location information acquired via GPS, the location tracking procedure according to the present method may be ended irrespective of a reception result of a 2nd location information. If the 1st location information is the location information acquired via the mobile network, the servers may stand by for a reception of a 2nd location information from the mobile terminal [S1715].

Thereafter, if the 2nd location information is received from the mobile terminal via the relay server 350 [S1716], the relay server 350 delivers it to the web server 310. And, the web server 310 may update a current location of the mobile terminal, which is displayed on the web terminal 200, into the 2nd location information.

Therefore, the location tracking using both of the GPS and the mobile network is simultaneously initiated by the above-mentioned method. In accordance with the information acquiring technique and the order of the acquired informations, a user can be provided with a fast and accurate location tracking result.

In the following description, the 2nd method is explained.

First of all, a locating tracking method according to the present embodiment relates to a method of processing a location tracking request made by a user via web more efficiently. If a location tracking command transmitted to the mobile terminal via the push server 320 in response to a user's request is lost due to a situation of the mobile terminal located in a shadow region or the like instead of being received by the mobile terminal, the corresponding location tracking procedure is not successful. The user having failed in the location tracking frequently attempts the location finding service again. Of course, in case of the failure due to a network state, a packet loss and the like, if a command is retransmitted within predetermined time, the probability of success may rise.

Yet, in case that the user gives the location tracking command for the reattempt consecutively and persistently, it may put considerable load on the server. Therefore, according to the present embodiment, a repetitive command execution is prevented in a manner that whether to execute a command in the mobile terminal is preferentially checked for location tracking requests that can be regarded as a one-time procedure. In particular, even if a user consecutively requests N-times location trackings via the web server, a successful command delivery to the mobile terminal is substantially performed once only, thereby reducing overly load put on the server. This is described with reference to FIG. 18 as follows.

Figure 18:
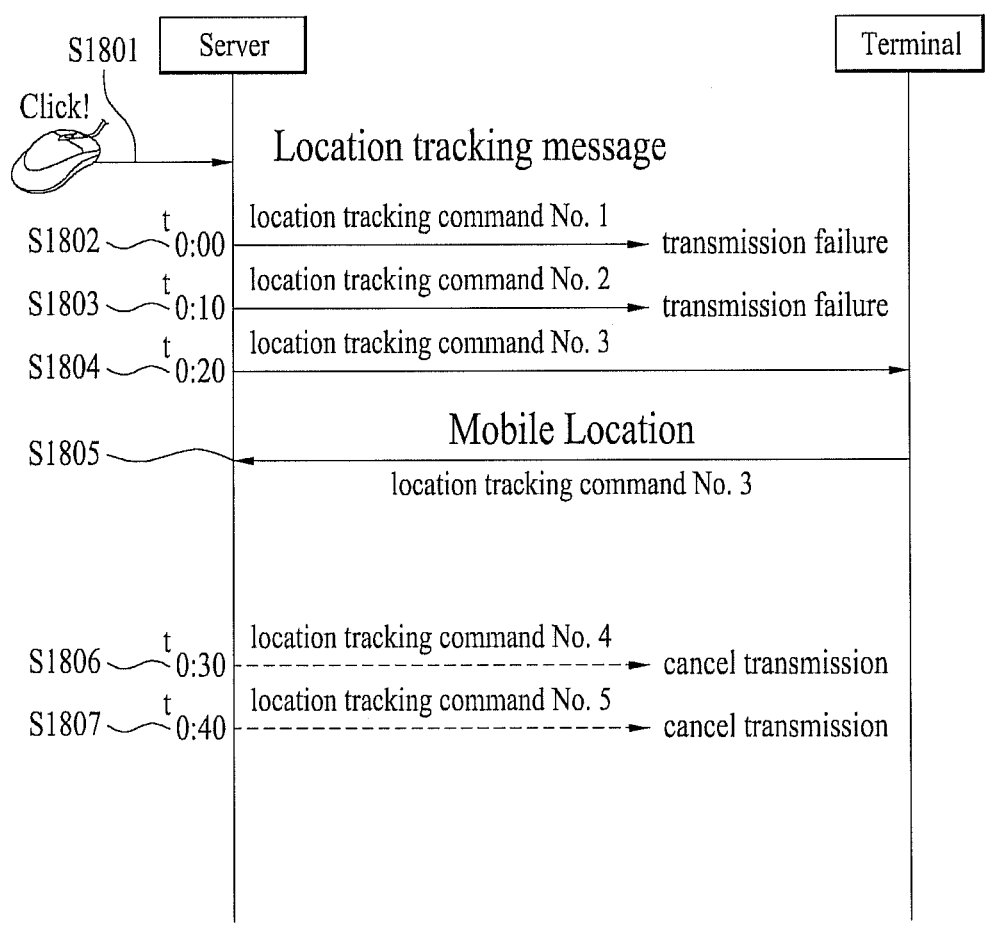
FIG. 18 is a flowchart for one example of a location tracking method for server load reduction according to one embodiment of the present invention.

FIG. 18 is a flowchart for one example of a location tracking method for server load reduction according to one embodiment of the present invention.

In FIG. 18, in response to a one-time request inputted by a user, assume that a location tracking command is transmitted to a terminal five times in 10-second interval. Assume that a web server or a push server is set to ignore a user's request repeatedly inputted by a user before completion of 5 location tracking command transmissions [1] or a successful reception of location information from the terminal [2]. In FIG. 18, the web server 310, the push server 320 or the relay server 350 may be commonly named a server. And, it is apparent to those skilled in the art that a function performed by a server in each step may be handled in a manner of being appropriately assigned in accordance with a function of each of the web server 310, the push server 320 and the relay server 350.

Referring to FIG. 18, a location tracking request made by a user via the web terminal 200 is received by a server [S1801].

In response to the user's request, the server transmits a 1st location tracking command to the terminal [S1802]. In this case, the location tracking command may contain an order identifier indicating that the corresponding location tracking command is transmitted for the nth time. If any response is not made by the mobile terminal for 10 seconds after the transmission, the server considers that the 1st command transmission is not successful and then transmits a 2nd location tracking command to the terminal [S1803]. If any response is not made by the mobile terminal for 10 seconds after the transmission, the server considers that the 2nd command transmission is not successful as well and then transmits a 3rd location tracking command to the terminal [S1804]. If the 3rd location tracking command is successfully received by the mobile terminal, the mobile terminal transmits a response to the server to indicate the successful command reception [S1805]. In this case, the response may contain an order identifier of the command. When the location tracking command is received, if the mobile terminal already acquires valid location information, the location information of the mobile terminal may be contained in the response message. If the server receives the response from the mobile terminal, the server may cancel the scheduled 4th and 5th command transmissions [S1806, S1807].

Compared to the method of transmitting the location tracking command as many as a count requested by a user, the above-described method enables a service load, which is put on a server due to a user's request, to be efficiently reduced.

In the following description, the 3rd method is explained.

First of all, the 3rd method relates to a method of acquiring a more accurate current location by verifying validity in accordance with a time of a location tracking result value. Generally, in accordance with features of an operating system, if a location information is acquired based on an event (e.g., activation of a map application, activation of a navigation application, etc.) for which acquisition of location information is required, the corresponding information is saved in the memory 160 for prescribed duration from the location information acquisition. In this situation, if a location tracking command is received by the mobile terminal, the controller 180 makes a response to the location tracking command with the previously saved location information instead of making a response by newly acquiring a current location information. In particular, the information collected and provided by Android API in accordance with a location tracking command may include a location information collected at a previous timing point instead of a location information at a timing point of giving the location tracking command.

Thus, since all location informations transmitted in response by the mobile terminal to the server are not always valid informations, a location tracking service according to the present invention proposes that the location information is then provided after performing validity verification of location information using time information. In particular, the controller 180 compares a timing point of creation of location information retained by the mobile terminal to a current time. If a corresponding time difference is equal to or greater than a prescribed value, the controller 180 determines that the corresponding location information is not valid and then controls a new location information to be collected. This is described with reference to FIG. 19 as follows.

Figure 19:
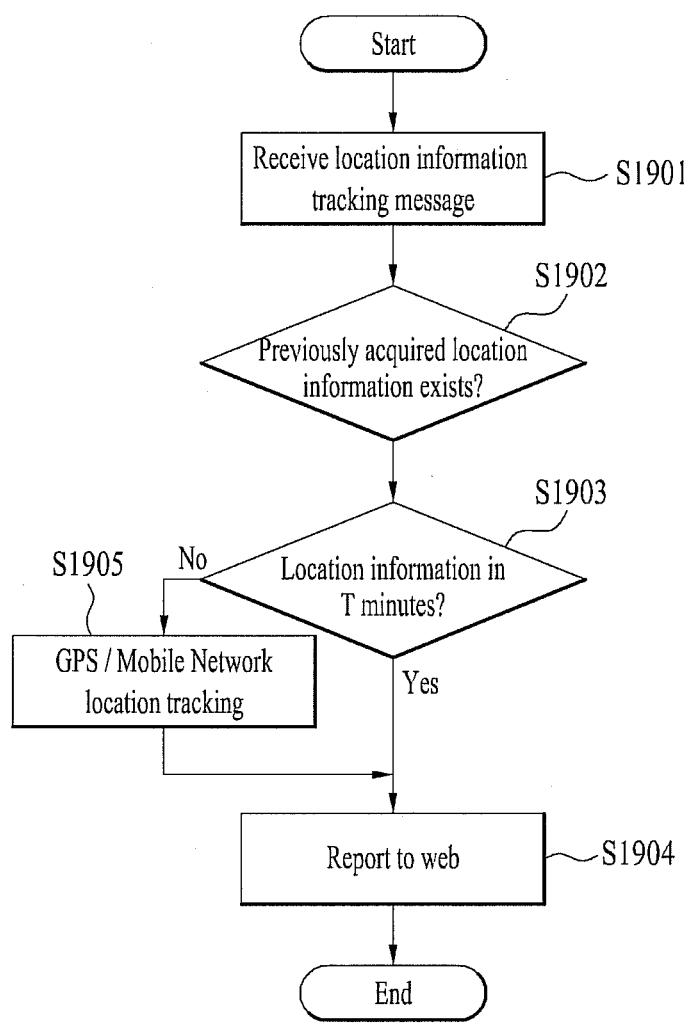
FIG. 19 is a flowchart for one example of a location tracking method in consideration of valid time of location information according to one embodiment of the present invention.

FIG. 19 is a flowchart for one example of a location tracking method in consideration of valid time of location information according to one embodiment of the present invention.

Referring to FIG. 19, a location tracking command is received by the mobile terminal [S1901].

Subsequently, the controller 180 checks whether there is a previously acquired location information [S1902]. If there is the previously acquired location information, the controller 180 checks a creation timing point of the corresponding location information and then compares a current timing point and the creation timing point with each other [S1903]. If a difference between the current timing point and the creation timing point is smaller than a preset value (e.g., T minutes), the controller 180 transmits the previously saved location information to the server in response to the received location tracking command [S1904].

On the contrary, if the difference between the current timing point and the creation timing point is greater than the preset value, the controller 180 acquires a location information at a current timing point by activating at least one of the position location module 115 for acquiring a location information via GPS and a related wireless communication module for acquiring a location information via a mobile network [S1905]. In this case, the related wireless communication module for acquiring the location information via the mobile network may include at least one of the mobile communication module 112, the wireless internet module 113 and the short range communication module 114.

Once the current location information is secured, the controller 180 transmits it to the server in response to the location tracking command [S1904].

By the above-described method, if the previously created location information is valid, it may be able to make a prompt response to the location tracking command. If no, it may be able to provide a user with an accurate information at a current timing point.

Audio Recording Function & Video Recording Function

In the following description, audio and video recording functions executable in addition to the aforementioned security providing functions are explained.

First of all, the audio and video recording functions may be performed together with or separately from the aforementioned security providing functions. The audio and video recording functions acquire audio and/or video around a lost mobile terminal and provide the acquired audio and/or video to a user of the lost mobile terminal, whereby a recovering rate of the lost mobile terminal can be raised.

Audio recording may be performed via the microphone 122 and video acquisition may be performed via the camera 121. If such an audio/video acquiring function is individually executed, it can be performed in the mobile terminal by the aforementioned execution command delivering procedure. And, the audio/video acquiring function can be automatically executed when such a security function as a web lock and the like is executed. The audio/video recording may be performed by periods. The audio/video recording may be performed by real time if there is a user's instruction via web API. The audio/video recording may be performed based on an event. The event based execution may mean that the audio/video recording is performed when a lost mobile terminal is in a specific state. This is a sort of a method for acquiring audio or video efficiently. For instance, after a web lock has been executed, if a finder of a lost mobile terminal inputs a password onto a substitute screen, the controller 180 may have high possibility of photographing a face of the finder in a manner of acquiring an image or video via the camera 121 provided to the front side of the body of the mobile terminal 100, as shown in FIG. 14(b). For another instance, when a remote alarm function is executed, since it is highly probable that a finder may look at the mobile terminal in response to the sound generated from the mobile terminal, the controller 180 may control the camera 121 to perform photographing as well. For further instance, while there is an incoming call, the controller 180 may control the camera 121 to perform photographing as well.

Besides, when the position location module 115 is active, if the mobile terminal enters a predetermined location or a location of the mobile terminal moves over a predetermined range, the audio/video recording may be performed. Thus, the data of the audio/video recording may be transmitted to the relay sever 350 so as to be checked by a user via the web terminal 200.

Identification Information for Security

In the following description, identification information for further raising security in the course of performing all the aforementioned security providing functions is explained.

First of all, the present invention proposes IMEI (international mobile equipment identity) to be used as information for identifying a mobile terminal in the course of performing the aforementioned functions. The IMEI is an internationally identifiable unique number currently given to every mobile terminal belonging to CSM/WCDMA network. And, equipments of the corresponding specifications are requested to have the IMEI installed thereon. Therefore, if such an abnormal situation as a theft, a loss and the like takes place, a corresponding device can be identified/cut off using the IMEI. As the IMEI is the information for uniquely identifying a hardware, it is not the information arbitrarily replaceable unlike SIM card. Of course, although the IMEI is checkable/modifiable/copyable somehow, statutory regulations apply to the check/modification/copy, it may have considerable security as an identifier given to a terminal.

Therefore, the IMEI may be able to play a role as an identifier for identifying a mobile terminal in exchanging the informations between the mobile terminal and the servers. Moreover, instead of directly using IMEI, it may be able to create a unique identifier in a manner of encryption by creating a protected key value using IMEI. In particular, the created unique identifier may be applicable to a providing of a lock function in case of a loss, a mobile terminal protection function in 3G/Wi-Fi environment, a protection of a preloaded and cached identifier and account information and the like.

Besides, in case that a service is performed with an identifier using a phone number by application of IMEI, it may be free from influence due to detachment/change of SIM. And, the IMEI application may have security advantage stronger than MAC address relatively vulnerable to change/modification. Moreover, if a blacklist containing IMEIs of reported mobile terminals is shared between related organizations, when distribution of terminals and IMEI informations increases legally/illegally, IMEI may work as a key to reveal theft and illegal use.

According to the above-described embodiments, the execution command transmitted from the web server 310 to the mobile terminal 100 via the push server 320 may differ in format or content in accordance with a function to be executed in the mobile terminal 100 via the execution command. And, a plurality of functions may be executed by a single execution command. And, program codes for performing the aforementioned functions may be installed on the mobile terminal by being downloaded via web. Moreover, program codes for performing the aforementioned functions may be basically loaded in the memory 160 of the mobile terminal. In this case, the memory 160 may include such a general storage medium, which is used for OS or application data storage of a mobile terminal as a memory card or such a special memory for storing BIOS or firmware.

Although there is a difference in accordance with an operating system more or less, the aforementioned security providing functions may frequently request a highest authority (e.g., root authority in case of Android OS) accessible to a system file and the highest authority may not be given to a general user. In this case, since the highest authority is not given to an application installed by download, when a program code is installed by download, some functions may be restricted. Hence, it may be preferable that the aforementioned security providing functions are basically loaded on a mobile terminal by a manufacturer of the mobile terminal.

According to one embodiment of the present invention, the above-described methods can be implemented in a program recorded medium as processor-readable codes. The processor-readable media include all kinds of recording devices in which data readable by a processor are saved. The processor-readable media include ROM, RAM, CD-ROM, magnetic tapes, floppy discs, optical data storage devices, and the like for example and also include carrier-wave type implementations (e.g., transmission via Internet). The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a wireless communication module configured to transceive data with an external device by wireless communication;
a user input unit configured to receive an input of a command from a user;
a display unit; and
a controller configured to, when a first signal indicating an execution of a web lock function is received from a mobile communication network via the wireless communication unit, execute the web lock function by controlling a first substitute screen including a password input window to be displayed on the display unit when the display unit is activated,
wherein when there is an incoming call after execution of the web lock function, the controller is configured to control a second substitute screen for providing limited functions only to be displayed, and wherein the controller is configured to control caller information to not be displayed on the second substitute screen.

2. The mobile terminal of claim 1, wherein when a password is inputted to the password input window via the user input unit, the controller transmits the inputted password to the mobile communication network via the wireless communication unit, wherein when a second signal indicating that the password is valid is received from the mobile communication network in response to the transmission, the controller removes the first substitute screen, wherein when a third signal indicating that the password is not valid is received, the controller maintains the first substitute screen.

3. The mobile terminal of claim 2, wherein when the third signal is received for a predetermined number of times, the controller controls the password input window to disappear from the first substitute screen.

4. The mobile terminal of claim 3, wherein when the second signal is received after the password input window has disappeared, the controller controls the first substitute screen to be removed.

5. The mobile terminal of claim 3, further comprising a memory configured to store user data, wherein when the third signal is received for a predetermined number of times, the controller encrypts at least one portion of the user data by a preset encryption algorithm.

6. The mobile terminal of claim 5, wherein when the second signal is received after the encryption has been performed, the controller decrypts the encrypted data.

7. The mobile terminal of claim 2, wherein the mobile communication network comprises a first server configured to transmit a command delivered from a web server to the mobile terminal and a second server connected to a database storing a valid password, wherein the signal is received from the first server, and wherein the inputted password is transmitted to the second server.

8. The mobile terminal of claim 7, wherein when the first signal is received, the controller makes a request for a validity check of the first signal to the second server, and wherein when a fourth signal indicating that the first signal is valid is received from the second server, the controller controls the substitute screen to be displayed.

9. The mobile terminal of claim 2, wherein until the second signal is received after displaying the first substitute screen, the controller recognizes an input via the first substitute screen only.

10. The mobile terminal of claim 1, further comprising a memory including a boot region, an operating system region and a user data region, wherein when a fourth signal is received from the mobile communication network via the wireless communication unit, the controller controls the boot region to be deleted to disable booting.

11. The mobile terminal of claim 1, wherein the first substitute screen is substituted for a standby screen, a home screen or a screen last displayed on the display unit before receiving the first signal.

12. The mobile terminal of claim 11, wherein when there is a lock function previously set before receiving the first signal, the controller controls the first substitute screen to be displayed after the lock function is unlocked.

13. The mobile terminal of claim 1, wherein the first substitute screen is displayed regardless of setting or non-setting of a basic lock function.

14. A method of controlling a mobile terminal, the method comprising:
receiving a first signal indicating an execution of a web lock function from a mobile communication network via a wireless communication unit;
when the display unit is activated, executing the web lock function by displaying a first substitute screen including a password input window on a display unit;
wherein when there is an incoming call after execution of the web lock function, controlling a second substitute screen for providing limited functions only to be displayed and controlling caller information to not be displayed on the second substitute screen;
receiving a password inputted via the password input window;
transmitting the inputted password to the mobile communication network via the wireless communication unit;

when a second signal indicating that the password is valid is received from the mobile communication network in response to the transmission, canceling the first substitute screen; and when a third signal indicating that the password is not valid is received, maintaining the first substitute screen.

15. The method of claim 14, further comprising:
receiving the third signal for a predetermined number of times; and
controlling the password input window to disappear from the first substitute screen.

16. The method of claim 14, wherein the first substitute screen is displayed regardless of setting or non-setting of a basic lock function.

17. A method of providing security to a mobile terminal in a mobile communication system including a web server, a web terminal configured to access the web server, a push server, a database server configured to store a first password and a relay server, the method comprising:
selecting a security function to be executed in the mobile terminal via the web terminal;
transmitting, from the push server, an execution command of the selected security function to the mobile terminal; and
executing the security function corresponding to the execution command in the mobile terminal,
wherein the security function corresponding to the execution command comprises a web lock function executed by displaying a first substitute screen including a password input window on a display unit of the mobile terminal; and
wherein when there is an incoming call after execution of the web lock function at the mobile station, the mobile terminal controls a second substitute screen for providing limited functions only to be displayed and caller information to not be displayed on the second substitute screen.

18. The method of claim 17, further comprising:
receiving, at the mobile terminal, an input of a second password after executing the security function;
transmitting, from the mobile terminal, the second password to the relay server;
delivering the second password to the database server from the relay server;
enabling the database server to compare identity between the second password and the first password;
transmitting a result of the comparison to the mobile terminal via the relay server; and
canceling, at the mobile station, the executed security function in accordance with the result of the comparison.

19. The method of claim 17, further comprising:
transmitting the execution command to the relay server from the mobile terminal prior to the executing step;
delivering the execution command to the database server from the relay server;
enabling the database server to compare identity between the execution command delivered from the relay server to the execution command delivered from the web server;
transmitting a result of the comparison to the mobile terminal via the relay server; and
enabling the mobile terminal to determine whether to execute the security function in accordance with the result of the comparison.

20. A mobile terminal comprising:
a wireless communication module configured to transceive data with an external device by wireless communication;
a touchscreen; and
a controller configured to, when a first signal indicating an execution of a web lock function is received from a mobile communication network via the wireless communication unit, execute the web lock function by controlling a first substitute screen including a password input window to be displayed on the touchscreen when the touchscreen is activated,
wherein when an invalid password is inputted to the password input window for a predetermined number of times, the controller controls the password input window to disappear from the first substitute screen.

21. The mobile terminal of claim 20, wherein when a password is inputted to the password input window via the touchscreen, the controller transmits the inputted password to the mobile communication network via the wireless communication unit, wherein when a second signal indicating that the password is valid is received from the mobile communication network in response to the transmission, the controller removes the first substitute screen, wherein when a third signal indicating that the password is not valid is received, the controller maintains the first substitute screen.

22. The mobile terminal of claim 21, wherein the controller controls the password input window to disappear from the first substitute screen when the third signal is received for the predetermined number of times.

23. The mobile terminal of claim 22, wherein when the second signal is received after the password input window has disappeared, the controller controls the first substitute screen to be removed.

24. The mobile terminal of claim 22, further comprising a memory configured to store user data, wherein when the third signal is received for a predetermined number of times, the controller encrypts at least one portion of the user data by a preset encryption algorithm.

25. The mobile terminal of claim 24, wherein when the second signal is received after the encryption has been performed, the controller decrypts the encrypted data.

26. The mobile terminal of claim 21, wherein the mobile communication network comprises a first server configured to transmit a command delivered from a web server to the mobile terminal and a second server connected to a database storing a valid password, wherein the first signal is received from the first server, and wherein the inputted password is transmitted to the second server.

27. The mobile terminal of claim 26, wherein when the first signal is received, the controller makes a request for a validity check of the first signal to the second server, and wherein when a fourth signal indicating that the first signal is valid is received from the second server, the controller controls the first substitute screen to be displayed.

28. The mobile terminal of claim 21, wherein until the second signal is received after displaying the first substitute screen, the controller recognizes an input via the first substitute screen only.

29. The mobile terminal of claim 20, wherein when there is an incoming call after execution of the web lock function, the controller is configured to control a second substitute screen for providing limited functions only to be displayed, and wherein the controller is configured to control caller information not to be displayed on the second substitute screen.

30. The mobile terminal of claim 20, further comprising a memory and an interface unit configured to connect with a memory card, wherein when a fourth signal is received from the mobile communication network via the wireless communication unit, the controller controls at least part of the memory or the memory card to be deleted.

31. The mobile terminal of claim 30, wherein when a fifth signal is received from the mobile communication network via the wireless communication unit, the controller controls a boot region of the memory to be deleted to disable booting.

32. The mobile terminal of claim 20, wherein the first substitute screen is substituted for a standby screen, a home screen or a screen last displayed on the touchscreen before receiving the first signal.

33. The mobile terminal of claim 20, wherein when a card for identifying a subscriber or a user is changed, the controller controls information of a changed card to be transmitted to a predetermined device.

34. A method of controlling a mobile terminal, the method comprising:
receiving a first signal indicating an execution of a web lock function from a mobile communication network via a wireless communication unit;
when a touchscreen is activated, executing the web lock function by displaying a first substitute screen including a password input window on the touchscreen;
receiving a password inputted via the password input window;
transmitting the inputted password to the mobile communication network via the wireless communication unit;
when a second signal indicating that the password is valid is received from the mobile communication network in response to the transmission, canceling the first substitute screen;
when a third signal indicating that the password is not valid is received, maintaining the first substitute screen; and
when the third signal is received for a predetermined number of times, controlling the password input window to disappear from the first substitute screen.

35. The method of claim 34, further comprising:
wherein when there is an incoming call after execution of the web lock function, controlling a second substitute screen for providing limited functions only to be displayed and controlling caller information not to be displayed on the second substitute screen.

36. The method of claim 34, further comprising:
wherein when a fourth signal is received from the mobile communication network, deleting at least part of a memory of the mobile station or a memory card connected via an interface module to be deleted.

37. The method of claim 36, further comprising:
wherein when a fifth signal is received from the mobile communication network, deleting a boot region of the memory to disable booting.

38. The method of claim 34, further comprising:
detecting a change of a card for identifying a subscriber or a user; and
transmitting information of a changed card to a predetermined device.

* * * * *